(12) United States Patent
Srivastava et al.

(10) Patent No.: US 7,496,904 B2
(45) Date of Patent: Feb. 24, 2009

(54) MINING DEPENDENCIES FOR TESTING AND RISK MANAGEMENT

(75) Inventors: Amitabh Srivastava, Woodinville, WA (US); Jayaraman Thiagarajan, Bothell, WA (US)

(73) Assignee: Microsoft Corporation, Redmond, WA (US)

(*) Notice: Subject to any disclaimer, the term of this patent is extended or adjusted under 35 U.S.C. 154(b) by 432 days.

(21) Appl. No.: 10/608,985

(22) Filed: Jun. 26, 2003

(65) Prior Publication Data

US 2004/0268308 A1 Dec. 30, 2004

(51) Int. Cl.
G06F 9/44 (2006.01)

(52) U.S. Cl. ...................................................... 717/133

(58) Field of Classification Search ................ 717/101, 717/115, 124, 130, 132, 158, 133; 714/38; 709/223–224; 707/100
See application file for complete search history.

(56) References Cited

U.S. PATENT DOCUMENTS

| | | | |
|---|---|---|---|
| 5,623,661 A | 4/1997 | Hon | |
| 5,664,191 A | 9/1997 | Davidson et al. | |
| 5,774,722 A | 6/1998 | Gheith | |
| 5,805,899 A | 9/1998 | Evans et al. | |
| 5,848,274 A * | 12/1998 | Hamby et al. | 717/153 |
| 5,850,554 A | 12/1998 | Carver | |
| 5,933,640 A * | 8/1999 | Dion | 717/132 |
| 6,167,564 A | 12/2000 | Fontana et al. | |
| 6,175,957 B1 | 1/2001 | Ju et al. | |
| 6,185,734 B1 | 2/2001 | Saboff et al. | |
| 6,199,196 B1 | 3/2001 | Madany et al. | |
| 6,226,792 B1 | 5/2001 | Goiffon et al. | |
| 6,282,701 B1 | 8/2001 | Wygodny et al. | |
| 6,292,934 B1 | 9/2001 | Davidson et al. | |
| 6,314,558 B1 * | 11/2001 | Angel et al. | 717/118 |
| 6,321,240 B1 | 11/2001 | Chilimbi et al. | |
| 6,330,692 B1 * | 12/2001 | Kamuro et al. | 714/38 |
| 6,336,122 B1 | 1/2002 | Lee et al. | |
| 6,381,735 B1 | 4/2002 | Hunt | |
| 6,385,741 B1 * | 5/2002 | Nakamura | 714/38 |
| 6,385,768 B1 | 5/2002 | Ziebell | |
| 6,412,106 B1 * | 6/2002 | Leask et al. | 717/124 |
| 6,427,230 B1 | 7/2002 | Goiffon et al. | |

(Continued)

OTHER PUBLICATIONS

Srivastava et al., "Effectively Prioritizing Tests in Development Environment", Feb. 2002, MSR-TR-2002-15, Publisher: Association for Computing Machinery, Inc., pp. 1-10.*

(Continued)

*Primary Examiner*—Tuan Anh Vu
(74) *Attorney, Agent, or Firm*—Klarquist Sparkman, LLP

(57) ABSTRACT

Programs are rarely self-contained in software environments. They depend on other programs or shared subsystems like language run time and operating system libraries for various functionalities. A change in one of the external subsystems may affect the program and one or more other external subsystems.

A method or system collects and propagates information about dependency between logical abstractions within a binary file (e.g., basic block, procedure, etc.), dependency between binary files, and dependency between subsystems (e.g., programs, component libraries, system services, etc,) In one example, such dependency information is exposed to a tool (e.g., test tool, software development tool, etc.) via an application programming interface. A tool mines this information to manage testing, determine risks of change, or manage software development. The tool may also be integrated into the method or system.

9 Claims, 31 Drawing Sheets

U.S. PATENT DOCUMENTS

| | | | |
|---|---|---|---|
| 6,460,178 | B1 | 10/2002 | Chan et al. |
| 6,546,551 | B1 | 4/2003 | Sweeney et al. |
| 6,662,356 | B1 | 12/2003 | Edwards et al. |
| 6,665,866 | B1 | 12/2003 | Kwiatkowski et al. |
| 6,678,886 | B2 | 1/2004 | Kumon |
| 6,718,535 | B1 | 4/2004 | Underwood |
| 6,748,584 | B1 | 6/2004 | Witchel et al. |
| 6,748,591 | B1 | 6/2004 | Lewallen |
| 6,851,111 | B2 | 2/2005 | McGuire et al. |
| 6,957,422 | B2 | 10/2005 | Hunt |
| 6,996,806 | B2 | 2/2006 | Bates et al. |
| 7,003,759 | B2 | 2/2006 | Jameson |
| 7,020,329 | B2 | 3/2006 | Prempraneerach et al. |
| 7,058,941 | B1 | 6/2006 | Venkatesan et al. |
| 7,076,784 | B1 | 7/2006 | Russell et al. |
| 7,194,730 | B2 | 3/2007 | Pramberger |
| 2003/0204836 | A1 | 10/2003 | Srivastava et al. |

OTHER PUBLICATIONS

Srivastava et al, "Vulcan: Binary transformation in a distributed environment", Apr. 2001, Technical Report MSR-TR-2001-50, pp. 1-12.*

Amitabh Srivastava et al.; Effectively Prioritizing Tests in Development Environment: International Symposium on Software Testing and Analysis, Jul. 2002; 11 pages.

Zheng Wang et al.; BMAT—A Binary Matching Tool for Stale Profile Propagation; Journal of Instruction—Level Parallelism 2; Apr. 2000; pp. 1-20.

Amitabh Srivastava et al.; Vulcan Binary transformation in a distributed environment; Technical Report; Apr. 2001; pp. 1-12.

Hammer et al., "Dynamic Path Conditions in Dependence Graphs," ACM PEPM, pp. 58-67, 2006.

Milenković et al., "A Framework For Trusted Instruction Execution Via Basic Block Signature Verification," ACM SE, pp. 191-196, 2004.

Sreedhar et al., "A Framework for Interprocedural Optimization in the Presence of Dynamic Class Loading," ACM PLDI, pp. 196-207, 2000.

Vlaovic et al., "Improving BTB Performance in the Presence of DLLs," IEEE, pp. 1-20, 2000.

Srivastava et al., "Efficient Integration Testing using Dependency Analysis," *Online Publication*, Jul. 2005, 9 pages, <http://research.microsoft.com/research/pubs/view.aspx?msr_tr_id=MSR-TR-2005-94>.

* cited by examiner

FIG. 6

```xml
<system       name = "magsys">
  <subsystem name = "magellan"      file = "mag.xml">
    <binary  name = "coverage.dll"  file = "coverage.xml"/>
    <binary  name = "covercmd.exe"  file = "covercmd.xml"/>
    <binary  name = "magcore.dll"   file = "magcore.xml"/>
    <binary  name = "magtraces.dll" file = "magtraces.xml"/>
  </subsystem>
  <subsystem name = "vulcan"        file = "vulcan.xml">
    <binary  name = "vulcan23.dll"  file = "vulcan23.xml" />
    <binary  name = "vuldyn.exe"    file = "vuldyn.xml" />
    <binary  name = "vuldynpxy.dll" file = "vuldynpxy.xml" />
    <binary  name = "vulutil.dll"   file = "vulutil.xml" />
  </subsystem>
  <subsystem name = "vc"            file = "vc.xml">
    <binary  name = "mspdb71.dll"   file = "mspdb71.xml" />
    <binary  name = "msvcr71.dll"   file = "msvcr71.xml" />
    <binary  name = "msvcp71.dll"   file = "msvcp71.xml" />
    <binary  name = "msobj71.dll"   file = "msobj71.xml" />
  </subsystem>
  <subsystem name = "windows"       file = "windows.xml">
    <binary  name = "kernel32.dll"  file = "kernel32.xml" />
    <binary  name = "nt.dll"        file = "nt.xml" />
    <binary  name = "user32.dll"    file = "user32.xml" />
    <binary  name = "gdi32.dll"     file = "gdi32.xml" />
  </subsystem>
</system>
```

```
CLASS SYSTEM ←1202
    METHOD CREATEFROM ( *SYSTEMDEFFILE, *GUIDMAPFILE )
    METHOD DESTROY ( ) ←1208                          1204
    METHOD NAME ( ) ←1210
    METHOD FILE( ) ←1212
    METHOD GUIDMAPPINGFILE( ) ←1214
    METHOD FIRSTSUBSYSTEM ( ) ←1216
    METHOD NEXTSUBSYSTEM ( ) ←1218
    METHOD FIRSTNAMEDOBJECT( ) ←1220
    METHOD NEXTNAMEDOBJECT( ) ←1222
    METHOD FINDNODE ( *BINARYNAME, *FNNAME) ←1224
    METHOD FINDBINARY ( *BINARYNAME) ←1226
    METHOD FINDNAMEDOBJECT ( *NAMEDOBJECT) ←1228
CLASS SUBSYSTEM ←1230
    METHOD NAME ( ) ←1232
    METHOD TYPE ( )
    METHOD GETSYSTEM ( ) ←1236
    METHOD FIRSTBINARY ( ) ←1238
    METHOD NEXTBINARY ( ) ←1240
    METHOD GETASSEMBLY ( )
CLASS BINARY ←1244
    METHOD NAME ( ) ←1246
    METHOD XMLFILE ( ) ←1248
    METHOD DIRECTORY ( ) ←1250
    METHOD GETSUBSYSTEM ( ) ←1252
    METHOD FIRSTINPUT ( ) ←1254
    METHOD NEXTINPUT ( ) ←1256
    METHOD CREATEILBINARY ( )
CLASS NODE ←1260
    METHOD NAME ( ) ←1262
    METHOD GETFIRSTCALLER ( ) ←1264
    METHOD GETNEXTCALLER ( ) ←1268
    METHOD GETFIRSTCALLEE ( ) ←1270
    METHOD GETNEXTCALLEE ( ) ←1272
CLASS ILBINARY ←1274
CLASS ASSEMBLY ←1276
CLASS NAMEDOBJECT ←1278
CLASS FILTER ←1280
CLASS PROCEDURE ←1282
CLASS PARAMETER ←1284
```

| Input: | System Definition File: System, Subsystem Sets |
| | Binary Information File: Entry-Exit dependencies |
| Output: | A set of affected entry points for Binary and Subsystem, and System |

```
Algorithm:
    for each subsystem s in System        ← 1408
    {
        for each binary b in s        ← 1402
        {
                                            ← 1404
            mark blocks changed (modified or added)
            mark entry points of b that can reach a
            changed block as affected
        }                                    ← 1406
    }
                                            ← 1410
    while no new entry point is marked affected
    {
        for each binary b in Subsystem    ← 1412
        {                                    ← 1414
            for each exit point x in b not marked affected and
            connected to an entry point marked affected
            {                                ← 1416
                mark all entry points of b dependent on x as affected
            }
        }
    } while no new entry point is marked affected
    {
        for each subsystem s in System    ← 1418
        {                                    ← 1420
            for each exit point x in s not marked affected and
            connected to an entry point marked affected
            {                                ← 1422
                mark all entry points of s dependent on x as affected
            }
        }
    }
```

MINING DEPENDENCIES FOR TESTING AND RISK MANAGEMENT

TECHNICAL FIELD

The technical field relates to a computerized method for mining binary dependencies, such as dynamically linked library files shared by multiple subsystems, for managing software development risk and testing.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Programs are rarely self-contained in real software environments. They depend on other programs or shared subsystems like language run time and operating system libraries for various functionalities. These subsystems are developed external to the program, with their own test and development process. However, a change in one of the external subsystems may affect the program and one or more other external subsystems.

As a result, many users are reluctant to upgrade to newer versions of various software components as they fear that some dependent subsystems may stop working. Further, software development teams don't have the information they need to make informed decisions not only about the risks posed by changes made to subsystems they depend on, but risks they pose to other subsystems by changing their own subsystem.

Historically, techniques have been proposed for test selection and test prioritization to reduce the cost of testing. However, these proposed techniques focus internally only on a program. For example, they consider internal parameters such as changes made to the program itself, rates of faults in the program, and block coverage of the program.

SUMMARY OF THE INVENTION

The described technologies provide methods and systems for determining dependencies, determining change, determining potential risks of change, and for focusing resources for software development and testing.

One example provides abstractions for defining a complex system to determine and propagate dependency information about the system at various levels of granularity. Such abstractions scale well to large systems including software production and testing environments. System dependence is propagated to determine risks associated with change, to manage change, or to manage resources for testing. For example, a chain of dependency through one or more subsystems is used to determine risks of change, or to prioritize existing tests.

In another example, a method or system collects information about dependency between logical abstractions within a binary file (e.g., basic block, procedure, etc.), dependency between binary files, and dependency between subsystems (e.g., programs, component libraries, system services, etc,) In one example, such dependency information is exposed to a tool (e.g., test tool, software development tool, etc.) via an application programming interface. A tool mines this information to manage testing, determine risks of change, or manage software development. In another example, the tool is integrated into the method or system.

Another example provides a test prioritization approach that prioritizes an existing set of tests designed to cover a subsystem based on changes that have been made to its external subsystems. For example, existing tests are prioritized based on how many affected blocks the test exercises, including exercised unchanged blocks that depend directly or indirectly on a new or changed block in another subsystem. Existing tests are prioritized based on how many affected blocks the test exercises, including unchanged blocks in one subsystem that depend on another changed subsystem.

Additional features and advantages will be made apparent from the following detailed description of the illustrated embodiments, which proceeds with reference to the accompanying drawings.

BRIEF DESCRIPTION OF THE DRAWINGS

FIG. 6 is a program listing of an exemplary system definition file.

FIG. 12 is a program listing defining an example application programming interface for accessing dependency information.

FIG. 14 is a program listing of an exemplary method for marking affected basic blocks.

DETAILED DESCRIPTION

EXAMPLE 1

System Overview

Figure 1:
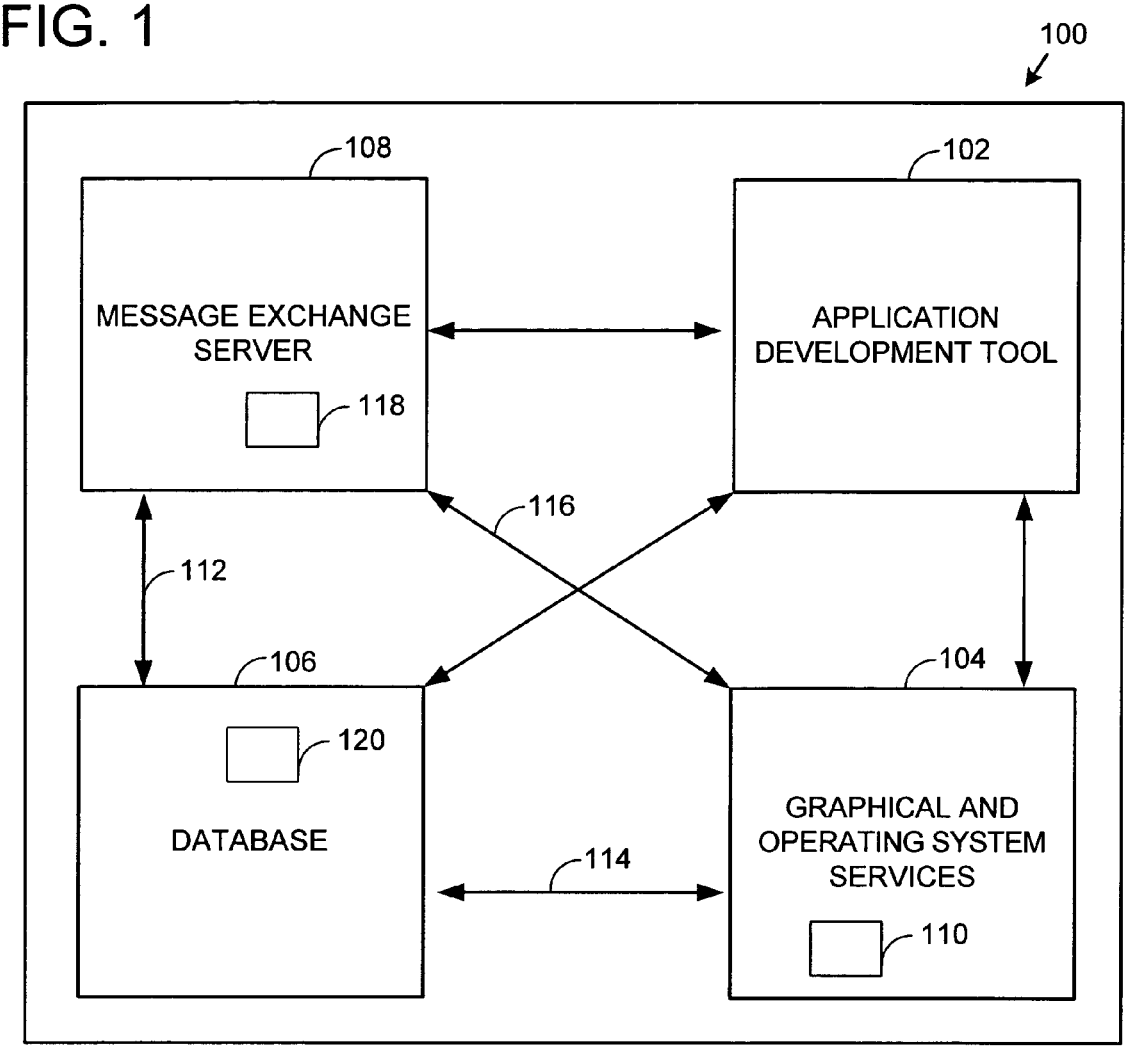
FIG. 1 is an exemplary block diagram showing an overview of a system with subsystems.

FIG. 1 shows an overview of a system 100 with dependent subsystems. In the modern computing environment, several subsystems 102-108 are interdependent. Any individual subsystem such as graphical and operating services 104 may individually be very large, but is typically also dependent on the services provided by other subsystems. For example, a subsystem 104 provides graphical and operating services (e.g., Microsoft® Windows™), that are utilized by other subsystems 102, 106, 108. Similarly, a database subsystem 106 (e.g., Microsoft® SQL Server™), provides services that other subsystems may need from time to time. Services are provided, for example, via one or more binary files (e.g., .dll, .exe, etc.). A subsystem is a logical collection of one or more binary files ("binaries"). For example, the Microsoft® Windows™ operating system subsystem contains hundreds of binary files such as kernel.dll, gdi.dll, and user.dll. Together the subsystems provide the aggregate services needed for the computing system 100.

In any specific subsystem 104, change 110 is often introduced into the subsystem. The types of changes are well known in the arts and include new or changed binary files, new or changed classes, methods, or functions within binary files, or new or changed basic blocks within binary files. These changes are typically represented by changes to the binary files and the changes are typically introduced by programmers developing, testing, and improving the binary files, the subsystems or the system. Often subsystems are designated in versions, and a new version of a subsystem may contain new services, repaired services, and unchanged services. Additionally, a post version release service pack may provide additional changes or repairs to a version of a subsystem. A change 110 made to one subsystem 104, may or may not affect other subsystems. A change 110 may have very localized effects on its subsystem 104, for example, when other binary files in the subsystem 104 call the binary file containing the change 110. In other cases, a change 110 affects one or more other subsystems 102, 106, 108, for example, when a binary file 118 in the dependent subsystem 108 calls on a binary file 110 containing change. A subsystem may depend directly or indirectly on a binary file containing the change. A binary file 118 may depend directly on a binary file 110 in another subsystem if it calls 116 the binary file. Other dependence is not so apparent. For example, a binary file 118 may call a binary file 120, and the called binary file calls another binary file 110. The interdependence between binary files (and subsystems) grows very complex. Because of the complex layers of dependence, a change 110 made in one subsystem 104 may affect other subsystems 108, 106, directly, or through a series of dependencies. Because of this interdependence, the effect of a change may have far reaching unpredictable effects. Since the extent of dependence for any given binary file varies, the affects of all changes are not equal.

EXAMPLE 2

Architectural Overview

Figure 2:
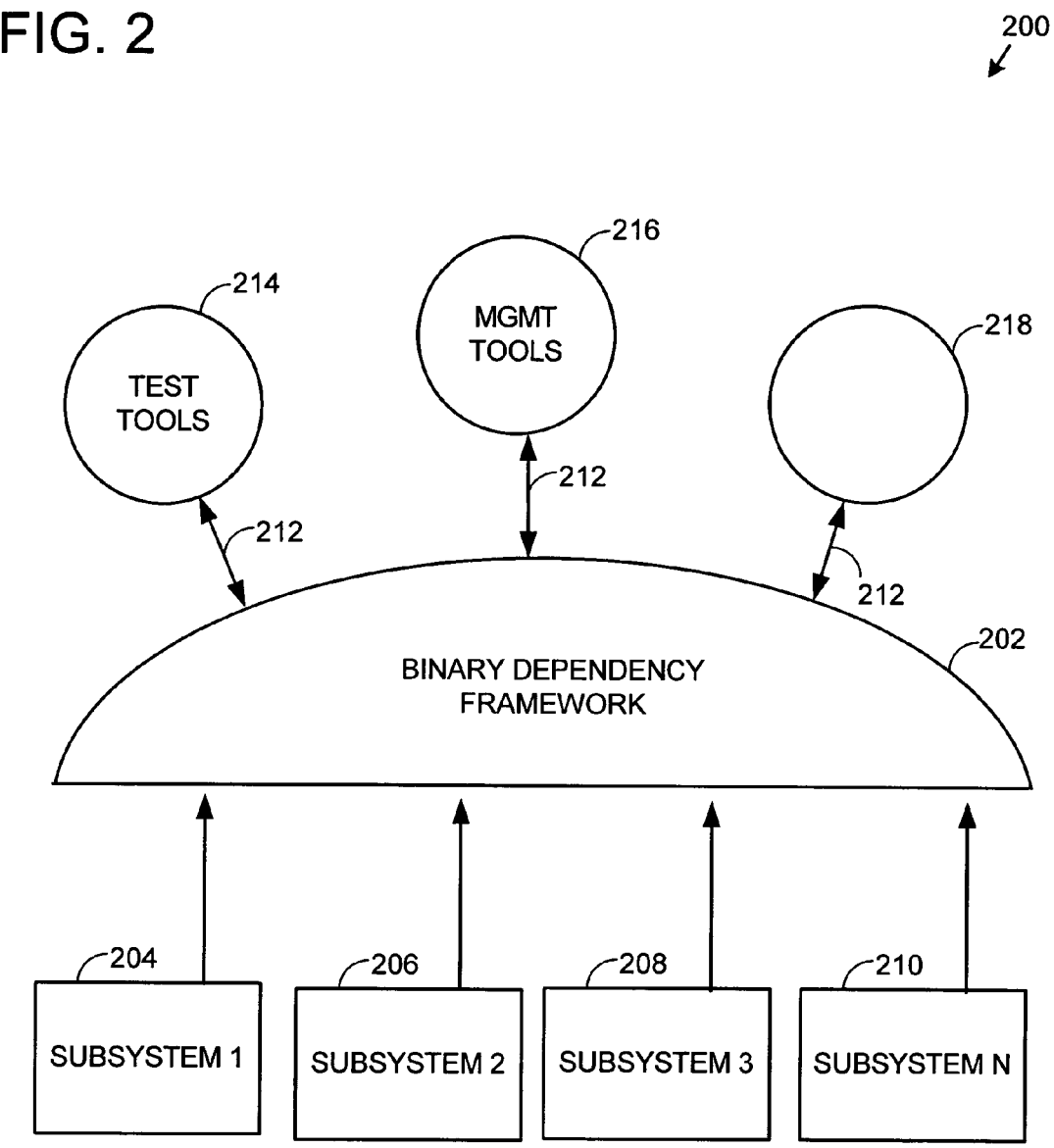
FIG. 2 is an exemplary block diagram showing an exemplary framework for determining binary dependencies.

FIG. 2 shows an exemplary system 200 for discovering and exposing binary dependencies. A dependency framework 202 receives a system definition (not shown) which defines one or more subsystems 204, 206, 208, 210. The system definition describes the subsystems and the binary files within each subsystem. The system definition input can be created, for example, via a graphical user interface. It can also be received by the framework as an input file. The dependency framework uses the system definition to determine a universe from which to discover binary dependencies. The dependency framework discovers what binaries depend on other binaries in providing services.

For example, using a management tool 216, a manager of a subsystem development team discovers how many binaries depend on a binary in the subsystem. This information is helpful for example, in determining the risk of a side affect of a proposed service change. If many binaries depend on a target binary, the manager can better evaluate the risks associated with changing the target binary. In another case, a testing and development manager using a tool 214, can use the dependency information, to determine what set of tests will cover the greatest number of binary files that depend on changed binary files. Other tools 218 can use this information for a multitude of other purposes. For example, a tool for determining system arrangement (e.g., subsystem placement of a binary file) based on exposed dependency. An application programming interface (API) 212 is exposed by the dependency framework, allowing other tools 214, 216, 218 to mine these dependencies for any purpose. If a service in a first subsystem depends on a service (e.g., binary) in another subsystem, the dependency framework discovers this dependency and exposes it through a dependency framework API.

Many decisions need to be made during the software development lifecycle, especially for evolving programs with subsequent periodic releases, upgrades, and post release fixes. For example, with a new release, what portions of the program must be retested when time and energy is limited? With a last minute change to a program, how significant are the risks? Should an important new feature be included, or are the risks too great? At the time of code check-in, how is the system affected by the changes, and what are the risks to the build? For regression testing, what systems depend on an API? All of these decisions are better answered with more information about system dependencies.

EXAMPLE 3

Exemplary Binary Abstractions

Figure 3:
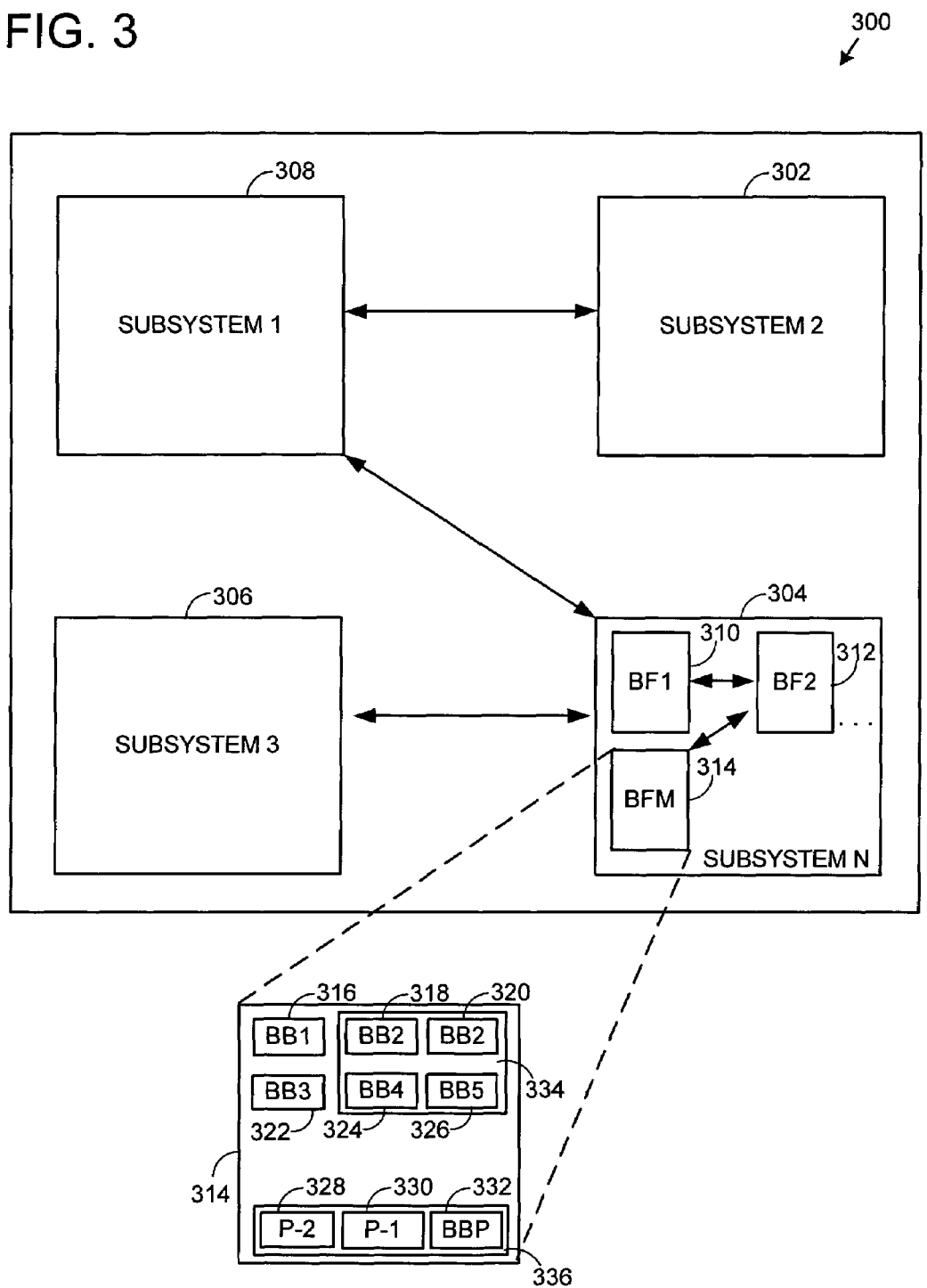
FIG. 3 is an exemplary block diagram showing exemplary abstractions for a system.

FIG. 3 shows exemplary abstractions system division 300. In this exemplary abstraction, a system 300 is a collection of subsystems 302-308, and a subsystem is a collection of binary files 310-314. A binary file 314 is a collection of binary blocks 316-332. Two or more basic blocks typically form some other logical abstraction 334 such as a procedure, function, method, object, etc. A binary file typically has plural such logical abstractions 334-336.

The technologies described herein are not limited to any given abstraction. Rather, binary dependencies are discoverable and exposable according to these technologies regardless of the abstraction. Logical abstractions exist for many reasons, and often help reduce complexity for human understanding. For example, binary files may be grouped into subsystems because they have some common overall function they support. In one example, a subsystem supports word processing, and programmers writing the word processing software are assigned to the team writing word processing software. In such a case, it can be helpful to view the binary files in the subsystem as "word processing" software, so a word processing team can be managed as a group. Such an abstraction may also be functional in nature, since the word processing files may be released according to customer word processing needs.

However, other levels or views of abstractions would just as easily be implemented by the described technologies. For example, the subsystem abstraction may not be required, if all binary files are viewed as part of the system. Levels of abstractions could be added or removed. For example, procedures could each exist in their own binary file, or multiple binary files (or even a whole program) might be combined into one binary file. Some of these choices will vary based on the speed and costs of memory in the future. In any such case, levels of dependency could be reduced to basic blocks, although that is not required. In another case, binary dependencies are determined at basic block level, procedural level, binary file level, and or subsystem level, and exposed at requested level(s) of abstraction. Regardless of the level of abstraction, dependency awareness adds value for software development, testing, and evolution.

A basic block is one or more program instructions that has one entry point and one exit point. The block includes machine language instructions in binary form (binary code).

Figure 4:
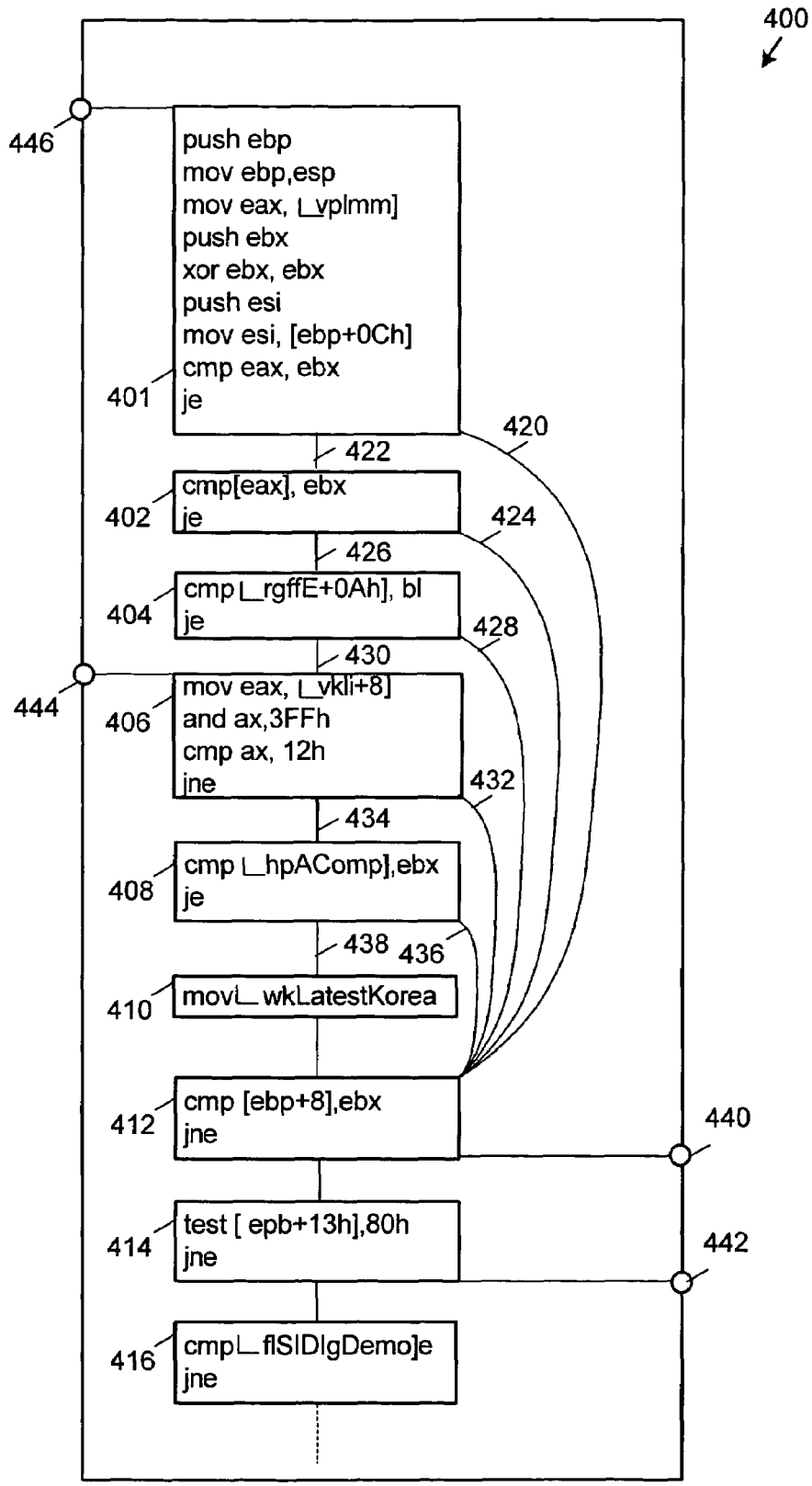
FIG. 4 is an exemplary block diagram showing exemplary binary blocks in a binary file or a procedure.

FIG. 4, shows example binary blocks 401, 402, 404, 406, 408, 410, 412, 414 and 416. Each block includes assembler language code, and each assembler language instruction corresponds to one instruction in the binary code. In each of the basic blocks, each of the instructions is executed in sequence until the last instruction is executed.

For example, in block 401 each instruction is executed until the last instruction of the block, "je", is executed. The instruction "je" is a conditional jump instruction that will cause execution of the program to branch or jump to another memory location when the tested condition is true. Similarly, in each of the remaining blocks shown in FIG. 4, the instructions are executed in sequence until the last instruction of the block, a conditional jump instruction, is executed. Thus, each basic block has a single entry point, the first instruction of the block, and a single exit point, the last instruction of the block.

Once a basic block is entered, the code in the block is executed sequentially until the block is exited. A binary file is examined in order to identify basic blocks according to entry and exit points. For a given machine language (e.g., Intel x86), even when assembly language instructions are not available for binary files, when necessary binary code is translatable back into assembly language instructions using a reverse assembler. Examination of the binary files may also be done without translating back into assembly language, since a computer doesn't need to view the binary file as assembly language instructions. Assembly language instructions are helpful when basic blocks are presented to humans (e.g., in a graphical user interface), since they are easier for humans to understand than binary code.

If the basic blocks in FIG. 4, represent a collection of basic blocks forming a binary file 400, notice that some of the basic blocks transfer control 420-438 to other basic blocks within the binary file. Other basic blocks transfer control outside the binary file 440-442. Depending on the desired level of granularity, information is gathered about entry and exit points entering and exiting the binary file (e.g., 440-446), and possibly the entry and exit points between basic blocks (e.g., 420-438) within a binary file. Exit points from one basic block, become entry points to other basic blocks that may exist within the binary file or within another binary file.

Similarly, if the basic blocks in FIG. 4 represents a collection of basic blocks forming an abstraction smaller than a binary file, for example, a procedure 400 (or other abstraction such as a method, object, etc.), notice again that some of the basic blocks 420-438 transfer control to other basic blocks within the procedure 400, while other basic blocks transfer control outside the procedure 440-442. Depending on the desired level of granularity, information is stored about entry and exit points entering and exiting the procedure, and possibly the entry and exit points between basic blocks within a procedure. When logical abstractions smaller than a binary file are used, then entry and exit points within and between such logical abstractions are collected.

This information concerning entry and exit points between basic blocks, procedures, other logical abstractions, binary files, or subsystems is useful in discovering and propagating exposing binary dependencies. For example, a basic block or procedure that exits to or depends on another basic block or procedure is considered dependent thereon.

EXAMPLE 4

Exemplary Dependency Framework Method

Figure 5:
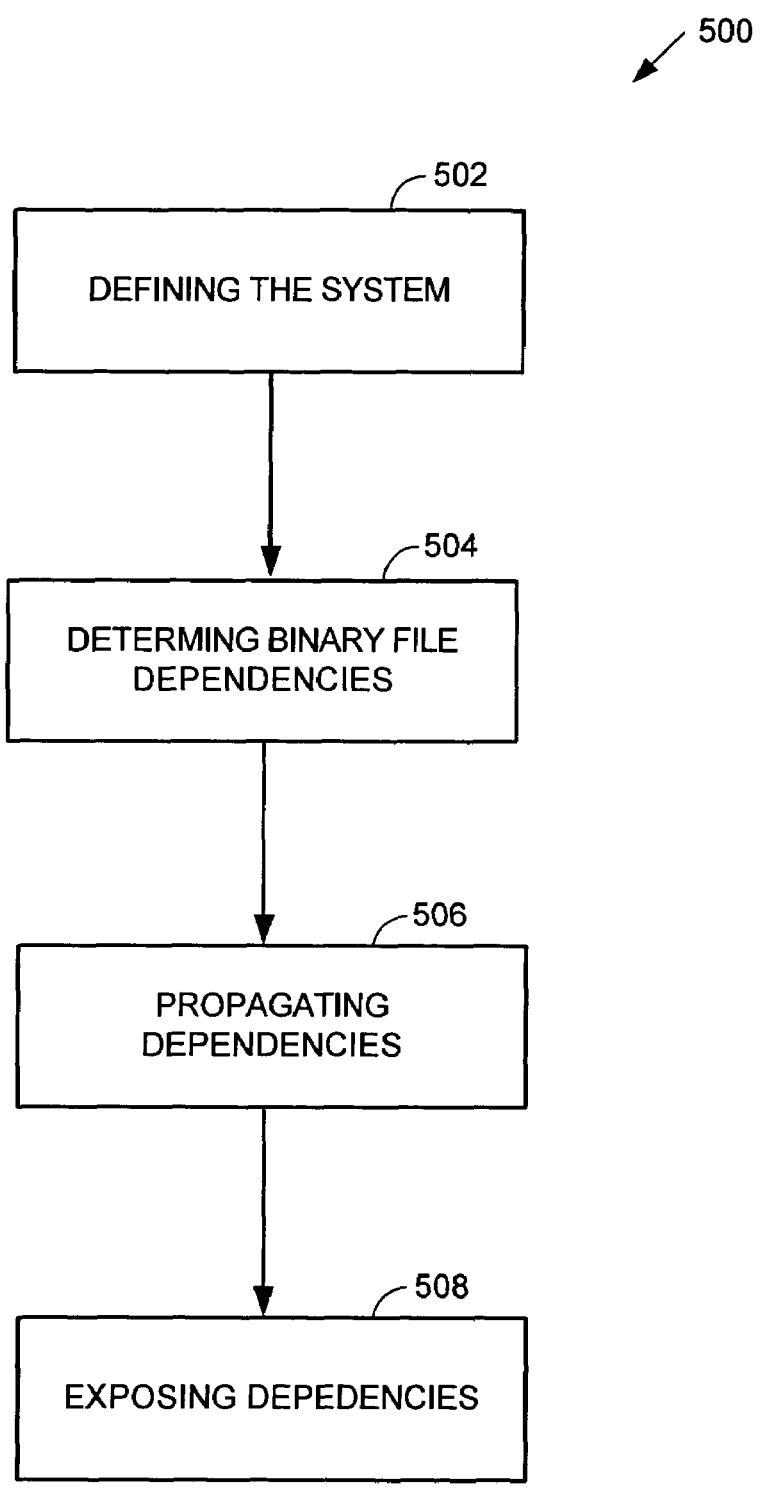
FIG. 5 is a flow chart of an exemplary method for determining and exposing binary dependencies.

FIG. 5 is a flow chart 500 of an exemplary method for determining and exposing binary dependencies.

At 502, the method begins when the universe for determining binary dependencies is defined. For example, a graphical user interface is displayed that allows a user to browse available subsystems and or binary files. The user selects binary files and or subsystems creating a universe from which to determine dependencies. In another example, a user creates a system definition file indicating binary files and or subsystems. In one example, a user selects all binary files for an identified system. The universe of binary files and or subsystems can be input through a graphical user interface (GUI) and or as a file. The system definition may also indicate where (e.g., database, files, etc.) to store binary dependency information. An exemplary system definition file is discussed later with reference to FIG. 6.

Figure 7:
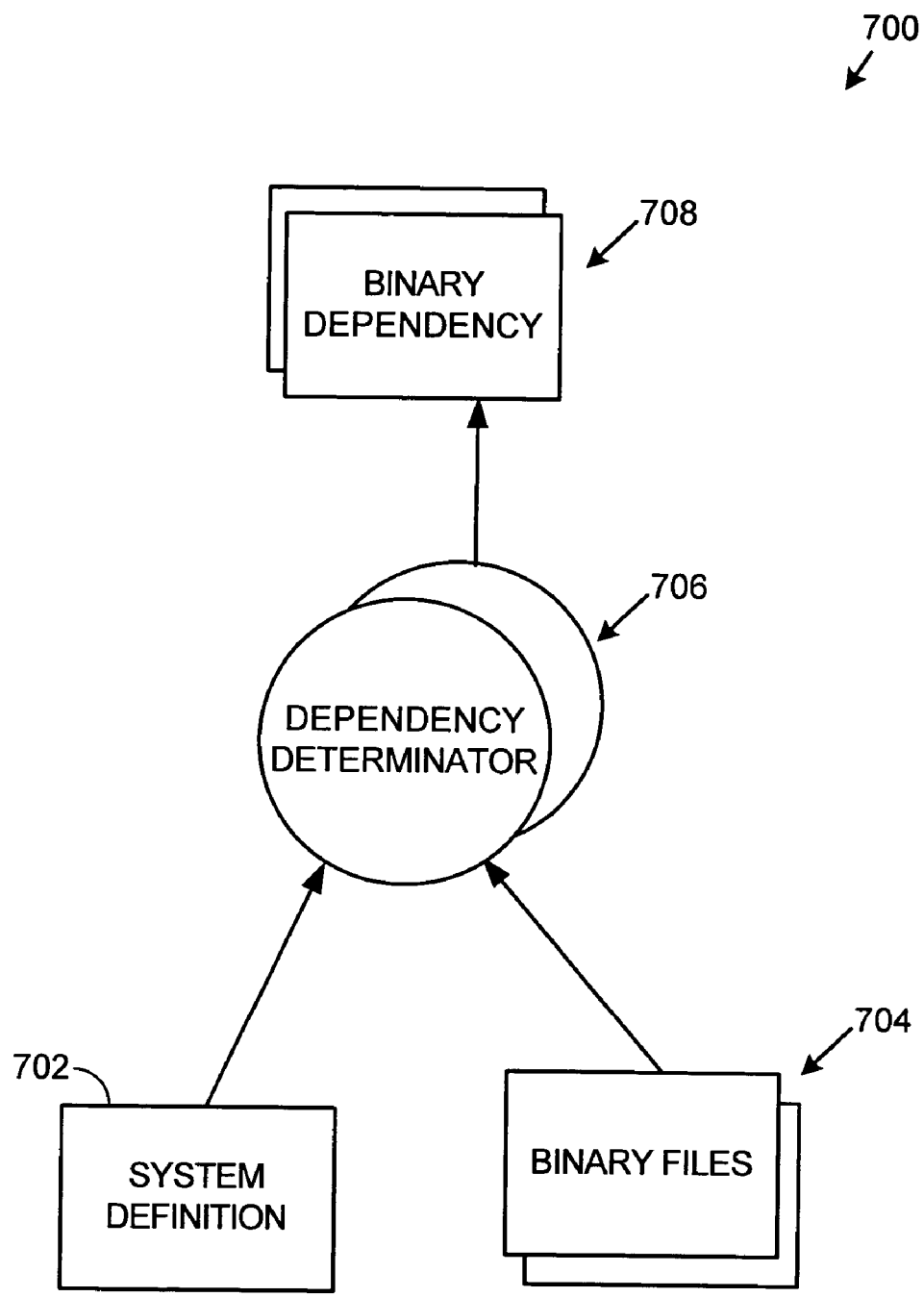
FIG. 7 is a block diagram of an exemplary system for determining binary file dependencies.

At 504, the method determines the binary dependencies for each binary file. For example, as shown in FIG. 7, a system definition 702 identifies plural binary files 704. The binary files in the definition often include more than one type of binary file (e.g., .dll, .exe, .js, etc.) The method determines based on the type of the binary file, a binary file dependency determiner 706 indicated for traversing a binary file of that type and determining binary dependencies. At 504, for each binary file in the system definition, the method invokes the binary file dependency determiner 706 indicated for binary files of that type. The binary file dependency determiner determines the binary dependencies for the given file, and creates a record for that binary file 706. This step 504 continues until a record 708 for each binary file is created.

A binary file comprises binary blocks procedures or other abstractions that contain basic blocks, and the method receives a binary file as input. In some types of binary files, many of the entry and exit points are contained in import and export tables. Other entry and exit points are determined by traversing the binary code and examining its behavior. Depending on the desired level of granularity of dependency information, the method collects entry and exit points within the binary file and or basic block entry and exit points with basic blocks outside the binary file. The desired exit and entry points are identified and saved, for example, in a file or database. Each binary file is associated with this set of entry and exits points (e.g., FIGS. 4, 8, 15, etc.). Uses supporting levels of abstraction within a binary file, further associate these entry and exit points within a binary file with procedures, methods, objects, or etc.

In some cases, further analysis is needed to determine other entry points such as ones due to dynamic calls, load libraries, call backs etc. In such cases, the method uses static analysis and data flow analysis to identify as many binary entry and exit points as possible. This method is non-precise and it may miss some obscure entry or exit points. However, these heuristics work well in practice identifying a high percentage of entry and exit points. As shown in FIG. 4, an entry point 444 is dependent on an exit point 440 if there is a path 436, 440 from the entry point 444 to the exit point 440.

As shown in FIG. 6, in one example, a system definition file identifies binary files 612 and a binary dependency file 614 to store the dependency record. In this case, the dependency information for the binary file is stored in an XML binary information file 614. The binary information file for each binary file can be maintained so when a subsystem is later changed, only the changed binary files need to be recomputed.

Figure 8:
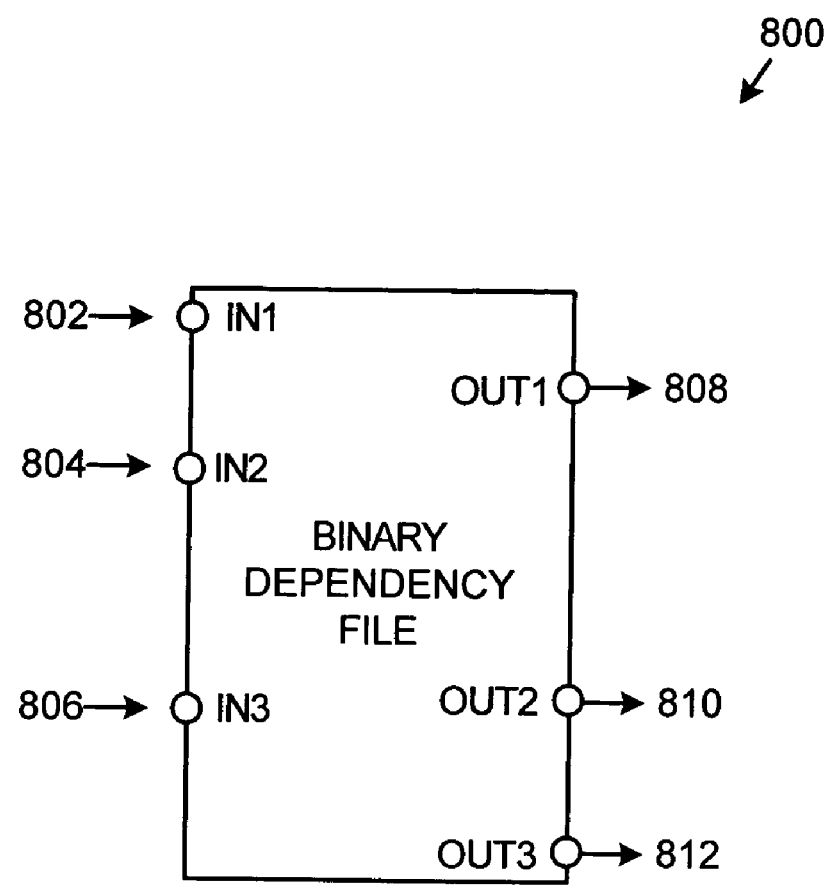
FIG. 8 is a block diagram of an example visual abstraction of a binary dependency file.

From the binary files, a record is created (e.g., a binary dependency file) that has a number of entry and exit points. An example abstraction of a binary dependency file storing entry and exit points for a binary file is shown in FIG. 8. This record represents where control reaches a binary file 802-806 through one of its entry points and leaves the binary file 808-812 through exit points. As shown in FIG. 8, an exit point 812 of the binary file that transfers control to another binary is marked in the binary dependency file (record) 800 representing the binary file. For example, a reference in the binary dependency file 808 indicates the destination location of another binary file and the entry point in that binary file. Once a record or a binary dependency file 800 is created for each binary file in the system, the method 500 is ready to begin creating information about the relationships between the binary dependency files.

Figure 9:
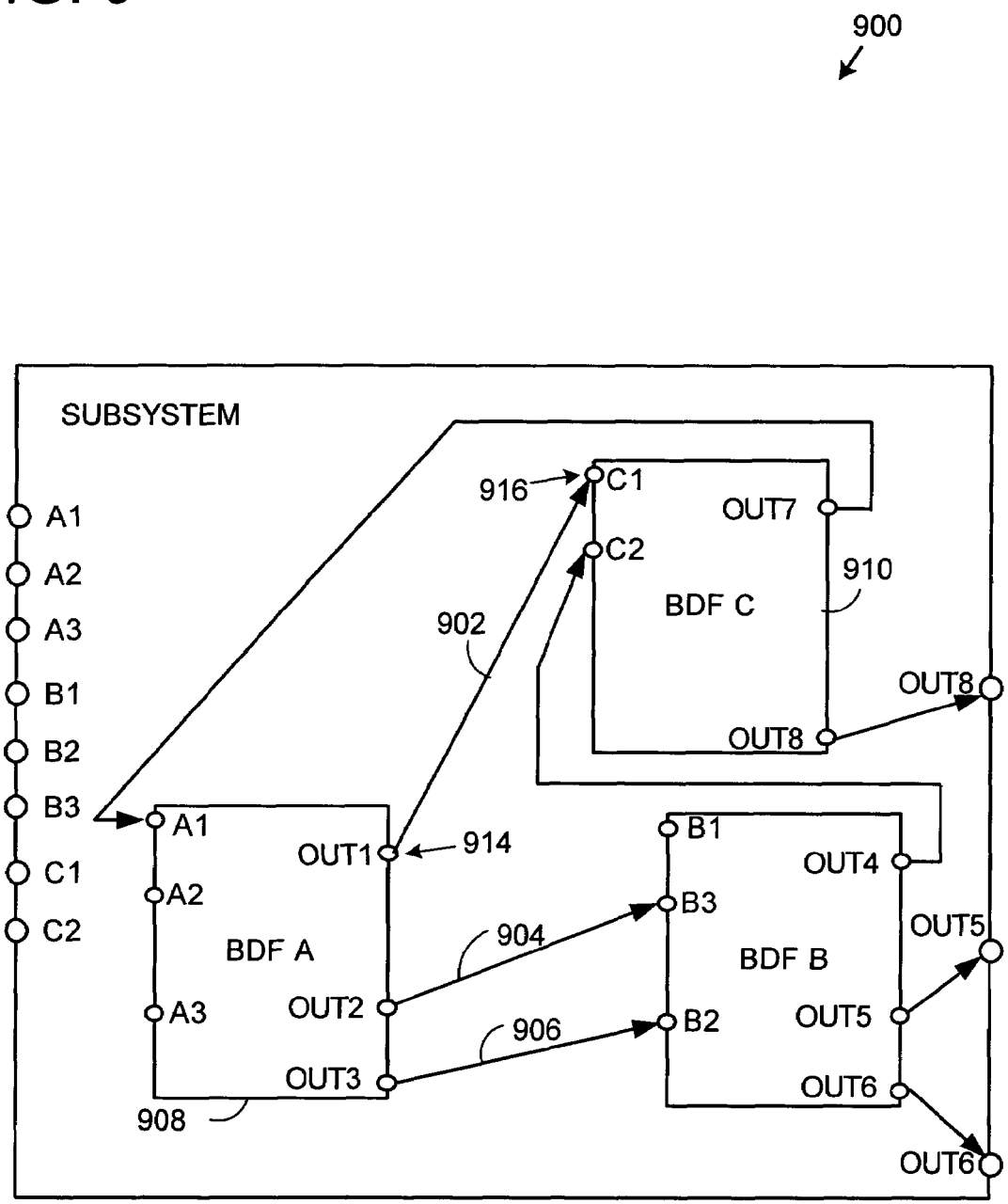
FIG. 9 is a block diagram of an example abstraction of subsystem dependency.

At 506, relationships between binary dependency files are propagated to reflect dependencies between binary files. Dependency relationships are built by connecting all the exit points of a binary dependency file to the corresponding entry points of the binary dependency file where control is transferred. For example, as shown in FIG. 9, the method 500 creates information 902 comprising binary dependencies. In this example, the information indicates a dependency between exit points and entry points. At this level of abstraction, an exit point is a binary file name 908 and an exit location 914 (e.g., BDF A, OUT1). An entry point is a binary file name 910 and an entry point 916 (e.g., BDF C, C1). At this level of abstraction, a binary dependency 902 is an exit point, entry point pair. The method examines each binary dependency file 908, and creates the exit-entry pairs 902-906 for the binary dependency file 908.

Figure 10:
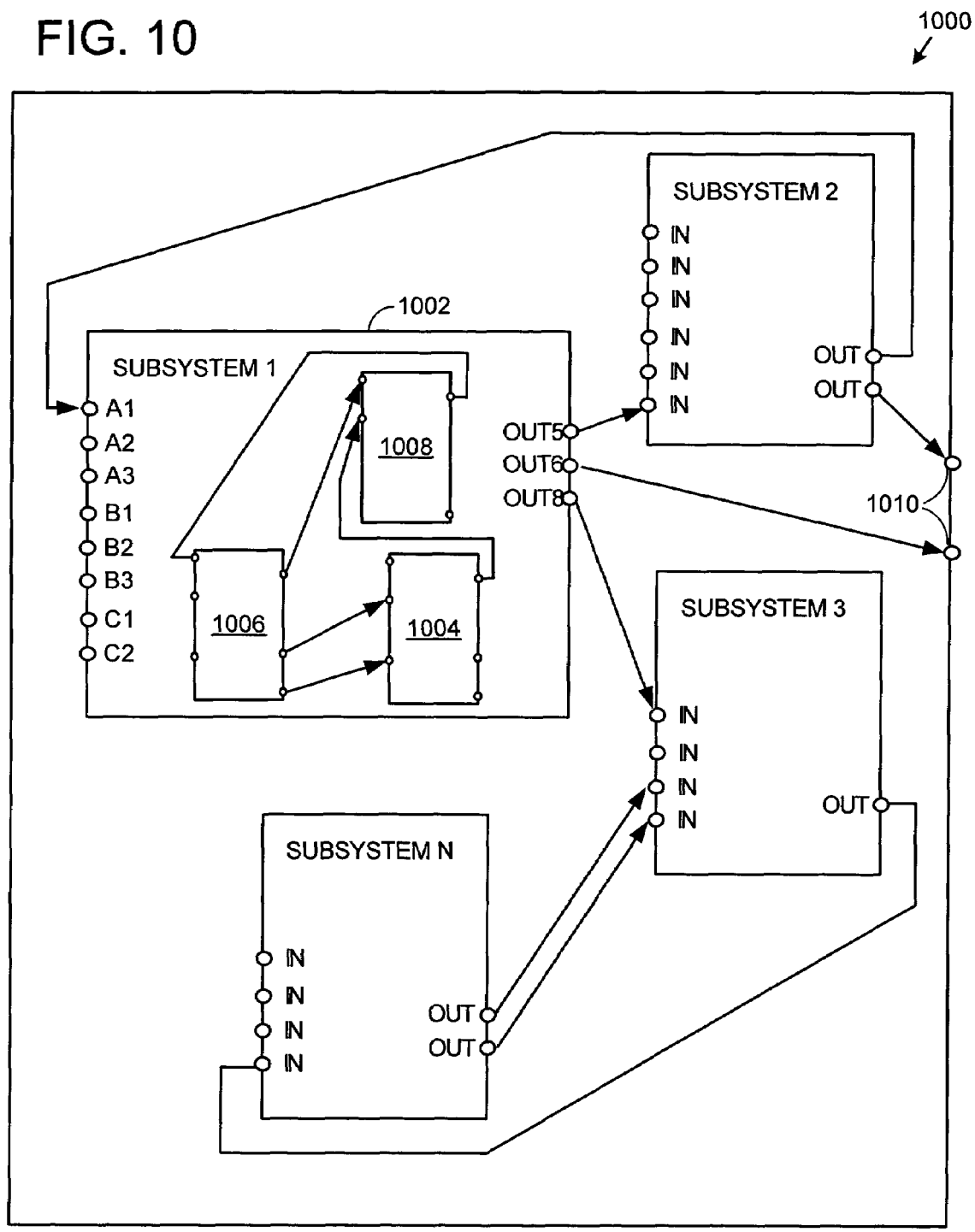
FIG. 10 is a block diagram of an example abstraction of system dependency.

In one example, dependencies between binary files are developed at a subsystem level of abstraction. Subsystem dependency relationships are built by connecting all the exit points of the binary dependency file to the corresponding entry point of the binary dependency file where control is transferred within the subsystem. As shown in FIG. 10, for the binary files in Subsystem1 (1002), the dependencies are determined for each binary dependency file 1004-1006 in the subsystem. For this example level of abstraction, the method 506 computes the entry and exit points of each subsystem. The entry points of a subsystem 1002 are the union of the entry points (e.g., A1, A2, A3, B1, B2, B3, C1, C2) of all its binaries 1004-1008. This information about each subsystem is gathered to replicate the behavior of binaries where all of its inputs are visible to other binary on the subsystem. The exit points of a subsystem 1002 are the union of those exit points that transfer control outside the subsystem (e.g., OUT5, OUT6, OUT8). Thus, an exit point of a binary that transfers control to a binary in the same subsystem is not an exit point of that subsystem.

Propagation continues in order to compute entry and exit points of the system 1000. For the system, the entry points of the system are the union of entry points of the subsystems (e.g., Subsystem 1 . . . N). The exit points for the system 1000 are the union of exit points that transfer control outside the system 1010. In a fully defined system which contains all its subsystems, the system should have no exit points. However, a team may decide not to define all its subsystems. In such a case, the system will have exit points. The method 506 handles these system exit points by directing all such exit points to an "undefined" subsystem. By knowing the entry and exit points at each level of abstractions, and defining these dependence relationships, the data is available for building a graph at a desired level of abstraction, by connecting the exit points to their corresponding entry points.

At 508, the method exposes a dependency relationship. For example, a request is received from a tool 214-214 via an API, and a dependency relationship is returned to the tool. For example, a manager receives a request to add certain functionality to a basic block, procedure, or binary file in the system. The manager inputs the basic block name, procedure name, or binary file name, and receives a list of basic blocks, procedures, or binary files that depend thereon. This information helps the manager determine the system wide risk of adding the functionality.

EXAMPLE 5

Exemplary System Definition File

FIG. 6 shows an example system definition file. In this case, the system definition file is represented as an XML file 600. The abstraction levels in this example are defined as system 602, subsystem 606, and binary (file) 608. In this example, the system definition file identifies the universe of desired dependencies by indicating the names 608 of the input binary files, and the name 608 of the XML file where the binary file dependency relationships are stored. Also, the example shows a subsystem name 606, and the name 610 of the XML file where the subsystem dependency relationships are stored. The names and arrangement of the mark-up tags in the XML files may be changed and arranged to indicate desired levels of granularity and abstractions. The dependency information is stored in XML files (e.g., 610, 614) according to the levels of abstraction of an example system.

Other examples could group dependency information in different arrangements so long as the information is stored for dependency mining.

In another example, the records used to store dependency information are kept in a binary format instead of XML. This may be the case, when performance is determined to be critical, and the selected binary format runs faster.

EXAMPLE 6

Exemplary File Dependency Determiner

FIG. 7 is an exemplary system for determining dependencies for a binary file. As discussed, a system definition 702 identifies plural binary files 704. A binary file dependency determiner (BFDD) 706, determines the binary dependencies for a given file, and creates a record 708 for that binary file 708. Most systems will have plural types of binary files, and it is desirable to have plural types of BFDD to parse dependencies for different binary file types.

When desired for a level of dependency granularity, an example BFDD collects entry and exit points between logical abstractions (e.g., basic blocks and/or procedures) within the binary file. When desired for another level of dependency granularity, an example BFDD collects entry points into a binary file from outside the binary file, and exit points exiting the binary file. The desired exit and entry points are identified and saved, for example, in a file or database. A BFDD determines entry and exit points at various possible levels of granularity for a binary file. Determining binary file dependency is further discussed above in view of FIG. 4 and FIG. 5 at step 504.

A system may contain hundreds or even thousands of binary files. In some cases, it is desirable to run plural BFDDs at the same time. This can be accomplished with multiple processors, parallel processors, distributed computing, etc. Once the dependency information 708 is gathered for binary files, processing resource needs are greatly reduced since the dependency information 708 is much smaller than the actual binary files 704.

EXAMPLE 7

Exemplary Binary Dependency File

FIG. 8 is an exemplary record or file containing binary dependency information related to a binary file. This information can be stored in other ways. In this example, a binary dependency file is a logical abstraction showing entry and exit points for a binary file. Whereas, another binary dependency file example (not shown), would also contain information about entry and exit points between basic blocks within the binary file. Another binary dependency file example (not shown), would also contain information about entry and exit points between basic blocks within the binary file and the procedures or other logical abstractions that contain basic blocks. The example binary dependency file (BDF) 800, contains exit point information for each basic block exit point 808-812 that transfers control outside the binary file. The information includes the name of the binary file and an entry point within that binary file where control is transferred. For example, the OUT1 (808) exit point contains the name of the binary dependency file (which in one example 612-614 is the same name as the binary file with an XML extension) and an entry point therein (e.g., procedure name, basic block entry point, etc.)

EXAMPLE 8

Exemplary Named Object

Figure 11:
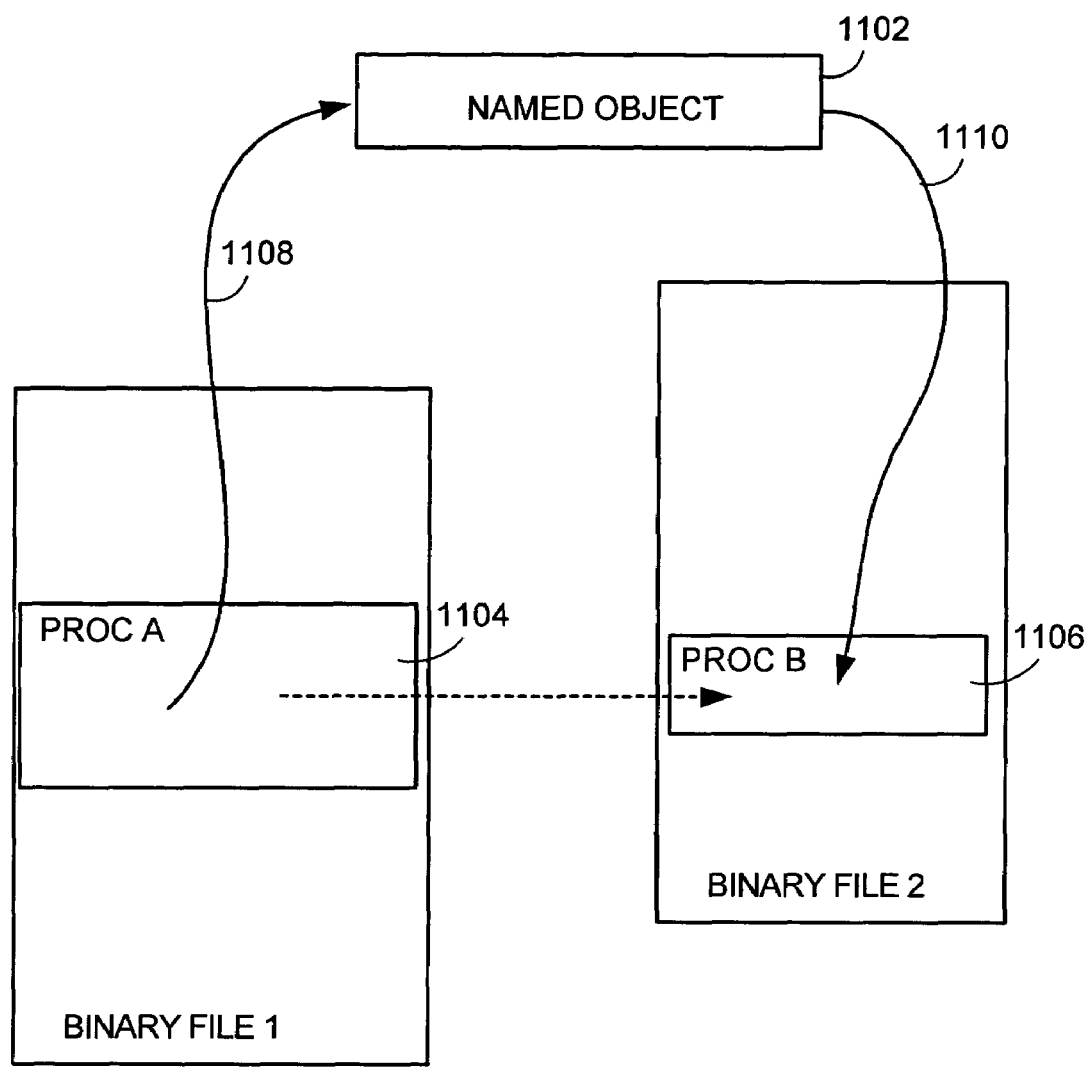
FIG. 11 is a block diagram of an example abstraction supporting named objects.

FIG. 11 is an exemplary naming reference used to support named objects. When a method or system (e.g., a file dependency determiner) examines a binary file in order to determine dependencies, there are certain cases when objects are created or referenced by name. In such cases, an abstraction for a named object 1102 is created for the reference. For example a procedure 1104 or basic block in a first binary file references (or creates) a semaphore, a registry key, a mutex, or other named object. The method creates an abstraction for the named object 1102, and later, for example, when another procedure 1106 or basic block refers to the named object, the method determines the dependence 1108, 1110. Thus, the named object becomes another available abstraction for determining and storing dependencies. The named object abstraction is also useful in detecting data dependencies and dynamic dependencies.

EXAMPLE 9

Binary Dependency Application Programming Interface

A binary dependency framework builds a graph of dependencies between binary files identified in a system definition (e.g., as discussed with reference to FIG. 5, 13, 14, etc.). An exemplary application programming interface (API) is defined for accessing the dependencies in graph. A binary dependency system builds the graph of the system using the system definition file. In this example, the framework organizes the information in a hierarchy which consists of a system, subsystem, binaries, procedures, and nodes. These levels of abstraction may be varied and do not limit the technologies discussed herein.

A system is a collection of subsystems, a subsystem is a collection of binaries (e.g., x86, MSIL, etc), and a node is an entry point through which binaries can be accessed (e.g., Export, COM Interface, etc.). The API is exposed through a number of classes and accompanying methods. Of course, the classes and methods represent selected abstraction levels, and the technologies described herein support other selected levels of abstraction and should not be limited by the presented API (1200).

A class called "System" 1202 exposes several methods. One method 1204 builds the dependency graph upon receiving a system definition file and a mapping file to locate binary files, interfaces and components via a map of component interface identifiers (e.g., COM IIDs) and or class identifiers (e.g., CLSIDs). Other methods destroy the graph 1208, return the name of the system 1210, return the name of the system definition file 1212, return the name of the globally unique identification mapping file 1214, return and iterate through the various subsystems in the system 1216, 1218, return and iterate through the various named objects 1220, 1222, find a node within a binary 1224, find a binary by name 1226, and find a named object by name 1228.

A class called "Subsystem" 1230 exposes methods that return the name of the subsystem 1232, return the parent system for this subsystem 1236, and return and iterate through various binaries present in the subsystem 1238, 1240.

A class called "Binary" 1244 exposes methods that return the binary (file) name 1246, returns the XML file name where the dependency information about the binary is found 1248, returns the directory location for the binary 1250, returns the parent subsystem 1252, and allows clients to iterate through all the exported functions in the binary 1254-56.

In this implementation, a binary file has code groupings within a binary file (e.g., basic blocks, functions, procedures, objects, and or other logical abstractions). A class called "Node" is created to represent such code groupings. For example, if a node is a function, when a function "f" calls a function "g", these functions are warapped into node abstractions, representing their respective dependencies. Of course, a node may also wrap other abstractions such as basic block and procedure abstractions. abstractions representing these functions are created. these functions are wrapped into node abstractions. A class called "Node" 1260, exposes methods that return a nodes name 1262, returns and iterates through the programming entities that call the node (e.g., from inside or outside the binary depending on the required level of granularity) 1264, 1268, and returns and iterates through the programming entities that the node calls (e.g., from inside or outside the binary depending on the required level of granularity) 1270, 1272.

Other classes can be used to obtain, represent, and traverse dependency information. For example, a given level of abstraction would require information about intermediate language binaries (or other binary types) 1274, assemblies 1276, named objects 1278, filters 1280 (e.g., objects used to create partial views of information), procedures 1282, and parameters 1284.

Using the described interface 1200, a tool 214-218 is programmed presenting a GUI that exposes for example, what binary files outside a binary file's subsystem, depends on a binary. Further, the methods allow the tool to drill down further into what procedures, functions, or even basic blocks, call a procedure, function, or basic block from anywhere in the system. By iterating through the dependency graph, a logical abstraction is selected (e.g., node, basic block, procedure, etc.), and the logical abstractions that depend directly or indirectly on that logical abstraction, can be identified. For example, a first logical abstraction in a first binary in a first subsystem, is exposed as having hundreds or thousands of direct or indirect dependencies, whether inside or outside the first logical abstraction, inside or outside the first binary, or inside or outside the first subsystem. Even chains of dependencies running in and out of multiple subsystems are discoverable and exposable with the described variations of technologies. Even before a binary file is changed, a system is defined and discovered, and the risks associated with a proposed change within a logical abstraction can be evaluated.

For example, a tool user inserts the name of a binary and a procedure where they are considering making a change. From this information, dependencies on that procedure are exposed, and risks are known before any change. In view of FIG. 17, metrics called change impact factors are later discussed in the context of changes already made to binary files. However, a management tool 218 is also able to mine these dependencies and present such metrics to expose "proposed change" impact factors, before any such change is made. For example, a manager of a subsystem development team (or other user) may request system wide dependency information for varying levels of granularity, and subsystem teams will know system wide risks created by changes to binaries, procedures, or basic blocks within their subsystem.

Mining these dependencies adds value to the entire software development lifecycle. For example, risks associated with proposed change can be used to develop tests that address the highest risk, before any design changes are made. This allows tests teams to examine prior test coverage and develop new test coverage to supplement highest risks earlier in the development cycle.

EXAMPLE 10

Binary Dependency Application Programming Interface

Figure 13:
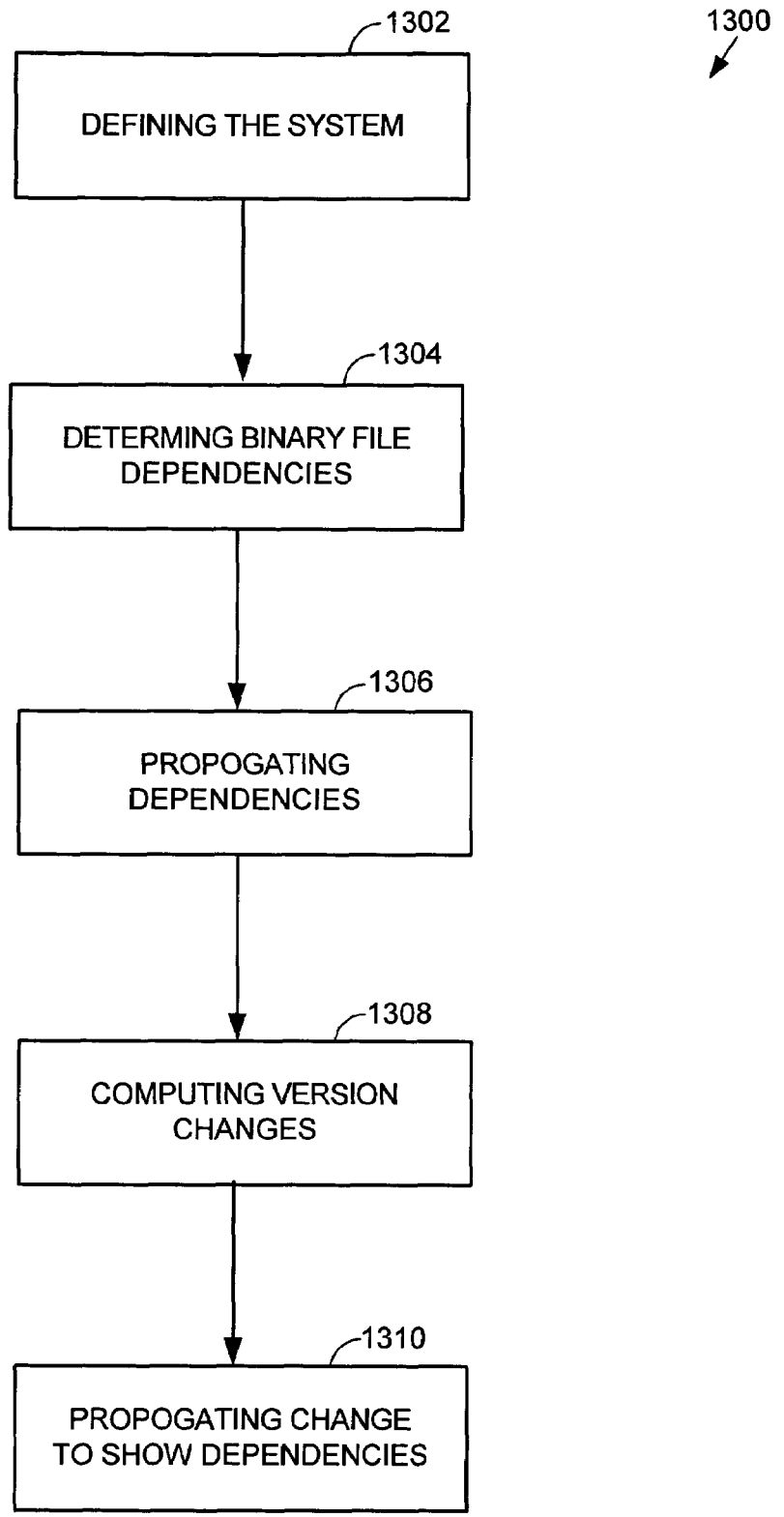
FIG. 13 is a flow chart of a process for defining, determining and propagating dependency.

FIG. 13 is a flow chart 1300 of an exemplary method for marking basic blocks that are new or changed with respect to a previous version, and for marking basic blocks that are unchanged if they depend directly or indirectly on changed basic blocks.

At 1302, the method receives or defines a system definition (e.g., a system definition file).

At 1304, the method determines for each binary file in the system, information about entry and exit points, and stores the information in a record associated with the binary file (e.g., FIG. 5, at 504).

At 1306, the method determines entry and exit points for each subsystem within the system, and for the system (e.g., FIG. 5, at 506).

At 1308, the method computes changes between versions of binary files in the subsystems in order to determine impacted blocks. The method receives for each changed subsystem, a set of the binary files in the subsystem that are new or changed since the previous version of the changed subsystem. The method computes changes between two versions of the binary for the subsystems that have a newer version available.

Binary version change analysis may be performed without any access to the source code. The method matches procedures and blocks within procedures. Several levels of matching may be performed with varying degrees of fuzziness. Comparison is done at a logical level using symbolic addresses, not hard coded addresses. The process allows correct matches to be found even when addresses are shifted, different register allocation is used, and small program modifications are made.

Matching blocks are further compared to determine whether they are identical (old) or modified and are marked accordingly. Unmatched blocks are designated and marked as new. Impacted blocks are the set of modified and new blocks, i.e., the blocks that have changed or are newly added in the new binary code as compared to the old binary code.

The method computes change at block granularity using a binary matching tool (e.g., see "Methods For Comparing Versions of A Program," U.S. patent application Ser. No. 19/712,063, filed Nov. 14, 2000, which is incorporated herein by reference). For each new or changed binary, the method marks the affected blocks (blocks that have either been modified or added).

Figure 15:
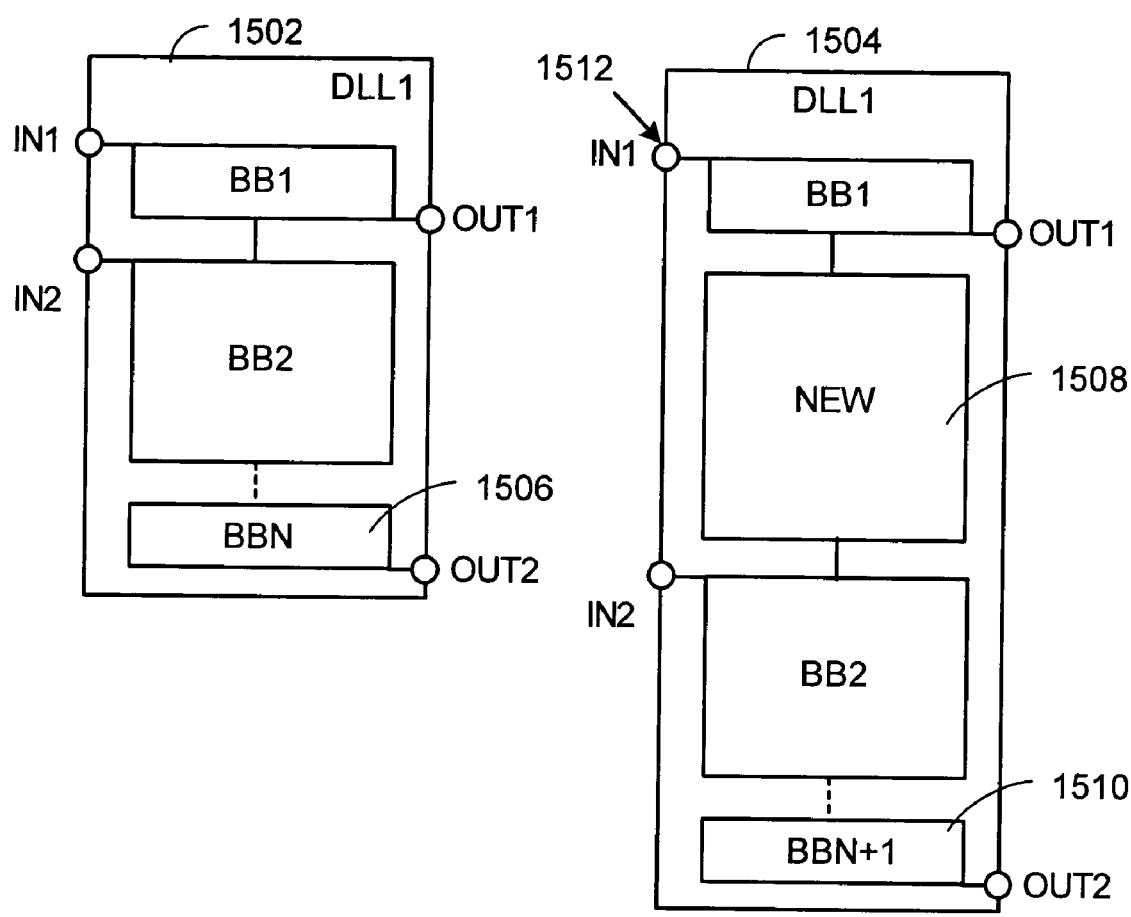
FIG. 15 is a block diagram that shows an original and new version of a binary file.

For example, FIG. 15 shows an original binary file 1502, and a new version of the binary file 1504. The original binary file was determined to have "N" basic blocks 1506. In the case the new version of the binary file has a new basic block 1508, so the new version has N+1 basic blocks 1510. Thus, a binary dependency file (not shown) associated with the new version 1504, marks the new basic block.

At 1310, the method propagates the changes to compute the affected parts of the system by performing analysis at each of three levels of abstractions—binary, subsystem, and system. For example, as discussed in view of FIG. 14, the propagation determines what basic blocks depend on the marked basic block. The blocks that depend directly or indirectly on a marked (affected) basic block are marked during propagation. This information (marked blocks) is used, for example, to determine how an affected basic block might affect an unchanged basic block in another subsystem. In one case, this information is used to exercise tests that execute unchanged basis blocks that depend on affected blocks elsewhere in the system.

Prior to the described technology, unchanged basic blocks within a program did not receive consideration for risks or testing, because the information that the unchanged block depended on a changed block in another subsystem was unknown. This propagation of dependency information marks these unchanged blocks so they can be exercised accordingly, or so risks can be evaluated properly.

EXAMPLE 11

Exemplary Method for Propagating Dependencies

FIG. 14 is an exemplary method 1400 for marking affected blocks, and propagating change thereby marking basic blocks that depend on affected blocks.

The method receives as input, a system definition file, and information indicating entry and exit dependencies (e.g., file (s)). The method returns a set of affected entry points for binary, subsystem, and system level abstractions.

For each binary in a subsystem 1402, the method marks the changed or added blocks 1404 by comparing the previous version of the binary with the new version. The basic blocks identifications and the marking information is kept in a record associated with the binary file. Once the basic blocks of a binary are determined, that information is saved for comparison purposes. Next, the entry points that can possibly reach a marked basic block are marked 1406. As shown in FIG. 15, since control flow entering at entry point "IN1" 1512 could reach the marked basic block 1508, that entry point 1512 is marked 1406 as affected. This continues until all binary files are processed in the subsystem 1402. The changed binary files in each subsystem 1408 are processed until all affected entry points in each subsystem are marked.

Figure 16:
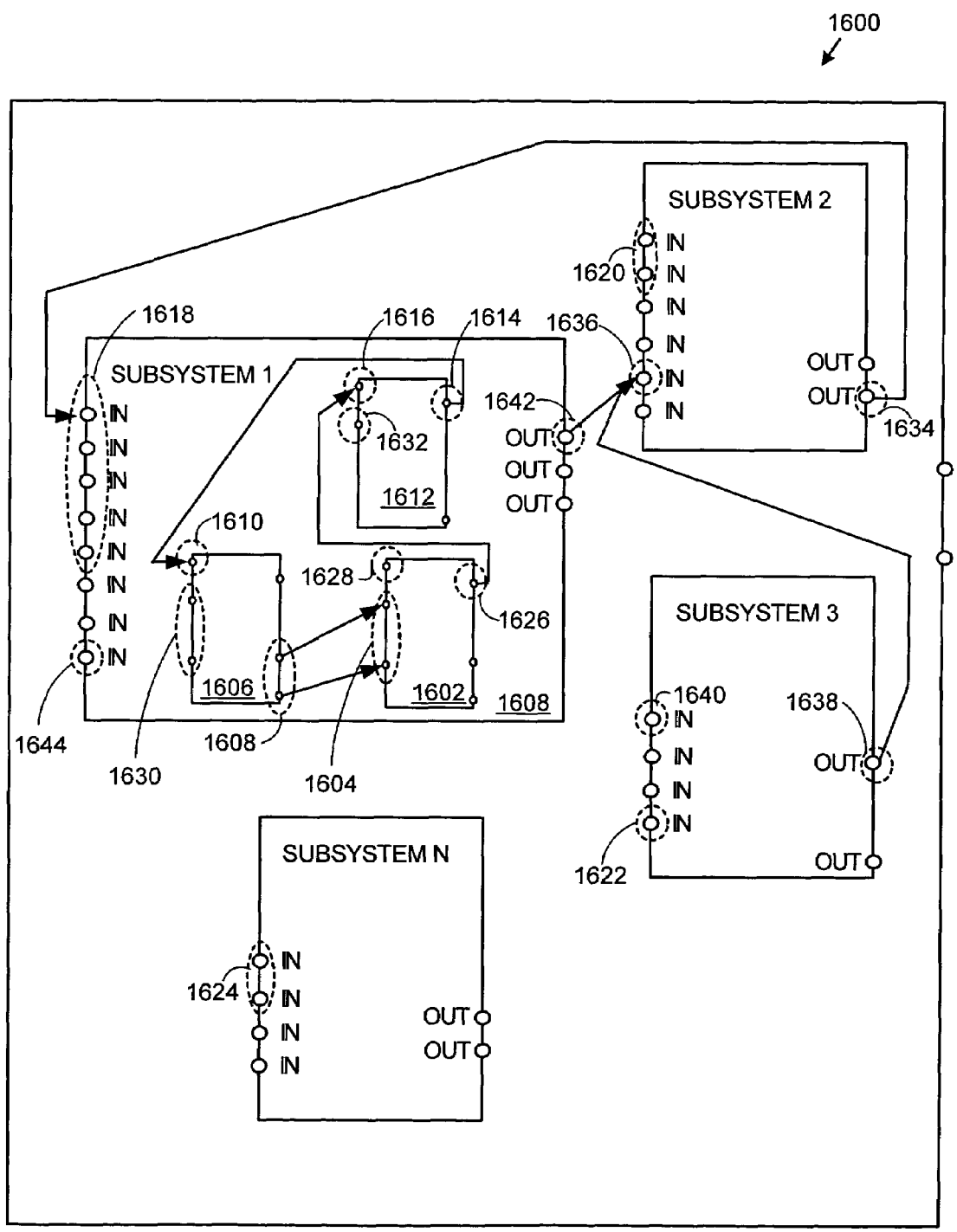
FIG. 16 is a view of an example graph illustration of propagated system dependencies.

For example, for a given binary file, all entry points that could reach a marked block through one of the control flow paths of the binary, are marked. These affected entry points are stored in a binary dependency file (or record) associated with the binary. As shown in FIG. 16, a binary dependency file 1602 associated with a changed binary file, has a set of one or more affected entry points 1604. After sets of affected entry points are marked for all changed binaries in all subsystems in the system, the method 1400 continues 1410. For simplistic illustration, assume that 1602 is the only changed binary file, and there are two affected entry points in the set 1604.

Next, until no new entry points are marked affected 1410, for each binary in the subsystem 1412, for each exit point of a binary not marked affected and connected to an affected entry point 1614, all entry points that are dependent on that exit point 1416, are marked affected.

For example, since binary 1606 has two exit points 1608 not marked affected, that are connected to affected entry points 1604, the entry point(s) 1610 that can reach the exit points 1608 reaching an affected entry point(s) 1604 are marked affected 1610. Thus, all entry points in the subsystem are marked affected if they depend on a control flow that could exit an exit point dependent on a marked entry point. After this process, all the entry points affected in the subsystem have been identified (as long as there are new marked entry points, a potential for other new marked entry points exist). For example, since a binary 1612, has an exit point 1614 that depends on an affected entry point 1610, the entry point(s) 1616, that depends on that exit point 1614, is marked affected. Further, since a binary 1602, has an exit point 1626 that depends on an affected entry point 1616, the entry point (s) 1628, that depends on that exit point 1626, is marked affected. Despite only two entry points initially affected 1604, through a chain of dependence, entry points have been marked affected in two other binaries 1610, 1616, and another entry point in this binary is marked affected 1628 because the chain of dependence. Since no new entry points depend on exit points that depend on affected entry points in this subsystem, a collection of affected entry points 1604, 1610, 1616, 1628 for this subsystem has been created 1618. Notice also, other entry points received as input remain unmarked (e.g., 1630, 1632). Thus, of the original eight entry points received as input for this subsystem, five have been marked 1618 affected.

Similarly, the affected entry points (initial and through chains of dependency) are collected for each subsystem 1618, 1620, 1622, 1624. Once affected entry points are collected for each subsystem, the method propagates throughout the system as follows. Notice that the subsystems shown in this case each has an initial set of entry points 1618, 1620, 1622, 1624.

Next, until no new entry points are marked affected, for each subsystem in the system 1418, for each exit point of a subsystem not marked affected and connected to an affected entry point 1420, all entry points that are dependent on that exit point, are marked affected 1422.

For example, since exit point 1634 in subsystem 2, depends on an affected entry point of subsystem 1, the entry points in subsystem 2 that can send control flow through to that dependent exit point 1634, are marked affected 1636. Thus, adding to the initial affected entry points 1620, in subsystem 2, an entry point 1636 depending on an exit point 1634, depending on an entry point in subsystem 1. Further, since an exit point 1638 in subsystem 3, depends on the newly affected entry point 1636 in subsystem 2, the entry point(s) 1640 depending on that exit point 1638 is marked affected. Thus, adding to the initial affected entry points 1622, in subsystem 3, an entry point 1640 depending on an exit point 1638, depending on an entry point in another subsystem 1636. Additionally, since another exit point 1642 depends on the affected entry point 1636, the entry point(s) depending on that exit point is marked 1644.

Thus, the method performs the same analysis at the system level by again connecting the entry and exit points of each subsystem. Marking all exit points connected to affected entry points as affected. The same process is repeated again until all the affected entry points in the system are marked. Since affected entry points of the system are the union of all the affected entry points of the subsystems, the binaries which may be affected by the change have been marked.

Thus, the technologies uncover chains of dependency through subsystems into other subsystems. In one example, an unchanged block is marked affected because it depends through a chain of control flow on a new or changed block in another subsystem. In another example, an unchanged basic block is marked affected because it depends on a chain of control flow through another subsystem and back into its own subsystem. By marking these unchanged blocks affected, a test that exercises them could uncover a program error that occurs when execution traces the control flow to the new or changed block.

By performing the analysis at lower abstractions and then using the information to compute at the higher abstractions, the method is scalable to very large systems.

EXAMPLE 12

Exemplary Metrics for Measuring Change

Once change propagation is complete, information exists about how binaries in one subsystem depend on binaries in other subsystems. These levels of abstraction of dependencies from system, subsystem, binary, procedure (etc.), and basic block, held in information records (e.g., binary 614, subsystem 610, etc.), provide the information necessary to create metrics for change called "Change Impact Factors".

Once metric for change called "Span of Change" (SOC) determines how widespread effects of change are, as follows:

$$SOC = (\text{Number Effected Binaries/Total Number of Binaries}) * 100$$

Another metric called "Density of Change" (DOC) determines how deep the effects of change are, as follows:

$$DOC = (\text{Number of Effected Functions/Total Number of Functions}) * 100$$

Finally, a metric called "Change Impact Factor" (CIF) gives a scaled range of change for impact, as follows, $$CIF = Log10((SOC * DOC) + 1)$$

Figure 17:
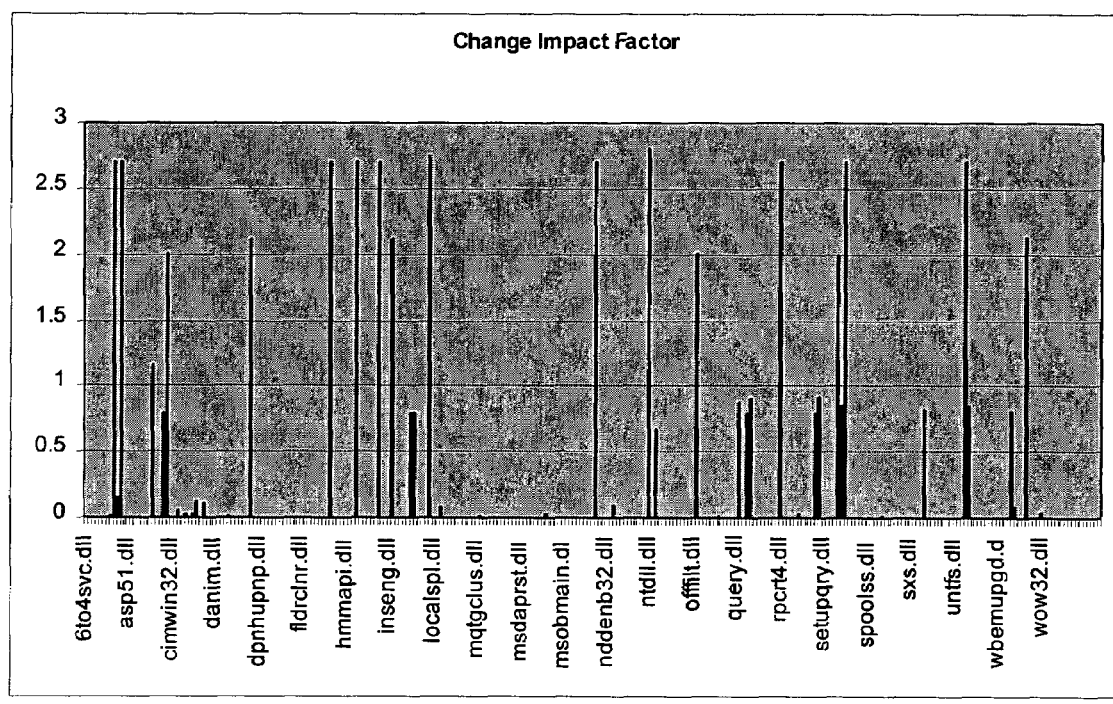
FIG. 17 is a view of an example graphical display of relative impacts of change.

FIG. 17 is an exemplary graphical output of showing the relative effects of changes made to binaries. The horizontal axis lists the names of binaries. The vertical axis shows, for the listed binaries, the CIF of change from 1 . . . 4. For example, a changed binary containing changes that affects more binaries in the system, will have an IS value closer to 4. Whether changes are actual or proposed the binaries with higher IS factors present a greater risk to the system. This information can be used, for example, to determine the greatest risks, or for prioritizing resources for testing software.

Figure 18:
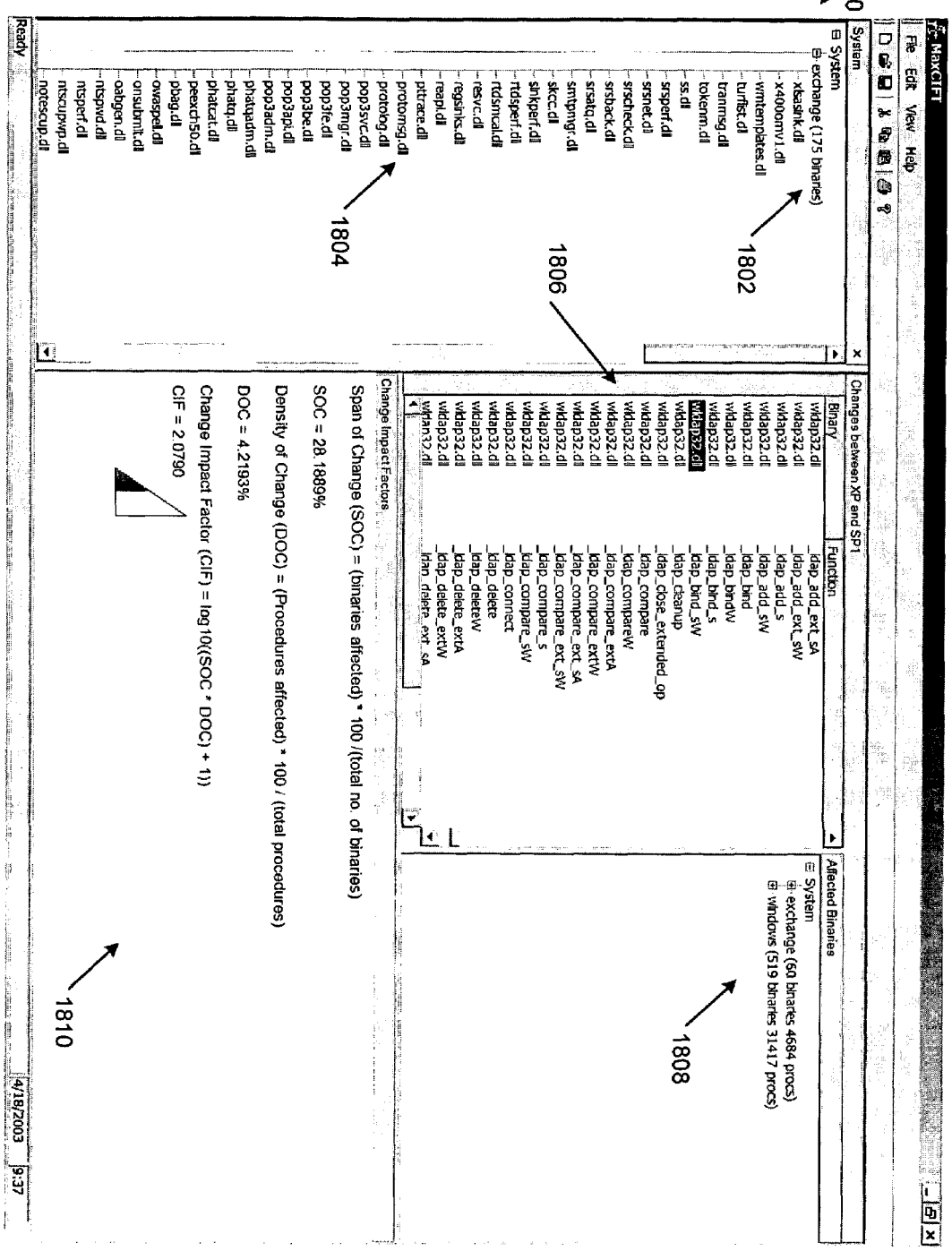
FIG. 18 is a view of an example graphical user interface displaying textual and graphical information about system dependencies.

FIG. 18 is an exemplary graphical user interface 1800 presenting dependency information. In this case a tree 1800 presents subsystems and binaries 1804 within subsystems. A panel 1806 shows a binary, and procedures within the binary that have changed between versions. Another panel shows how the changes affect binaries or procedures in subsystems 1808, while another panel shows change impact factors for the changes 1810. Other GUIs (not shown) expose, for example, graphs of dependencies, graphical paths of dependencies, textual paths of dependencies, chains of dependencies, basic blocks, and other presentations aiding in human understanding of the information. In one example, a three dimensional GUI visualization model is used to view information. In one such example, the entire dependency information from a particular point of view is represented to the user in a spherical form, showing relations in a spatial form. Other GUIs (not shown) help a user drill down into dependencies and walk through dependencies.

A described metrics (e.g., SOC, DOC, and CIF) help distinguish magnitudes of change or proposed change. Other variations for metrics for mining the system wide dependencies provide insight into relative dependencies, for example, for evaluating risk and or for test planning. Using the described technologies, one benefit is mining and relating propagations of system dependencies to expose relative impacts. This value is added despite what relations of impacts are selected. The described technologies add this value, and they add it in a way that is scalable.

EXAMPLE 13

Exemplary Methods for Determining Test Coverage

It is valuable to know what parts of a program execute while a program test is performed. This information can be obtained during execution of software by inserting checkpoints into the blocks of the software, executing the software tests, collecting information generated by the checkpoints and storing the resulting data in, for example, a database. Thus, the checkpoints notify a monitoring program every time the checkpoints are accessed. This test coverage information is helpful in reducing resources required for testing changed software, since many tests can be reused. Coverage analysis accesses coverage indicators pertaining to the software tests. The coverage indicators indicate, for each test, which of the blocks are executed.

Coverage analysis determines whether a new block is executed by determining whether at least one predecessor block and at least one successor block of the new block are executed by any of the software tests, skipping any intermediate new blocks. If so, the coverage indicators are updated to reflect that the software tests associated with the predecessor and successor blocks execute the new block.

Alternatively, coverage analysis may determine that a new block is executed by a software test by determining whether any software tests execute at least one successor block, skipping any intermediate new blocks. If at least one successor block is executed, then the coverage indicator for any of the software tests that execute the successor block is updated to reflect that the software test also executes the new block.

Another alternative method of performing coverage analysis is to examine arc coverage. An arc is defined as a branch. For example, FIG. 4 shows arcs 420, 422, 424, 426, 428, 430, 432, 434, 436 and 438. After block 401 is executed, either block 402 or block 412 will be executed, depending on whether the branch defined by arc 420 or arc 422 is taken. Similarly, after block 402 is executed, either block 404 or block 412 will be executed, depending on whether the branch defined by arc 424 or arc 426 is taken.

By using checkpoints, as discussed previously, data can be collected to determine which branches or arcs are taken when particular software tests are executed. Similar to new blocks, new arcs are arcs which cannot be matched to an arc in the previous version of the software. A new arc is determined to be taken when the blocks at both ends of the arcs are determined to be executed. In this case, the software tests that cause either the predecessor or the successor blocks of the arc to be executed, have coverage indicators indicating that the software tests executed the arc. Alternatively, a new arc is determined to be taken when a successor block, i.e., the block to which the arc branches, is executed. The coverage indicators, in this case, indicate that a software test causes the arc to be taken when the software test causes the successor block to be executed.

Thus, in one example, coverage analysis involves estimating (e.g., based on certain assumptions) whether a test will exercise a new or changed area of a program (e.g., basic blocks) based on whether or not it exercised the area of the previous version of the program near the new or changed area.

As discussed earlier (e.g., FIG. 14), when change is propagated through chains of dependency, unchanged blocks are marked as impacted (affected) blocks. Interestingly, by marking unchanged blocks that depend on changed blocks in other subsystems, coverage information indicating that the unchanged blocks were executed suddenly becomes valuable, for example, in prioritizing tests. Additionally, coverage information indicating that arcs are executed for given tests, suddenly becomes valuable when unchanged arcs are determined to be in a control flow path of such a dependency chain. This coverage information indicates that by executing tests that exercise a given block or are in a dependency chain, the test will likely exercise a new or changed block in another subsystem. Thus the coverage information for a subsystem helps determine tests for subsystem integration.

EXAMPLE 14

Exemplary Method for Prioritizing Tests for Integration Testing

For subsystems which have test coverage information, reuse of tests saves resources. This will often be true for subsystems that come from the internal development process. For example, in one case, a subsystem is an application (e.g., Microsoft Word™), and the binary files represent the ".dll" files that support the application. In such a case, the development team will create new or changed binary file versions for the application, and a test team (which may be a sub-team of the application development team) writes tests to exercise the application. Coverage analysis is used to determine which tests exercised which parts of the application.

Before the described technologies, test teams did not have information about how binary files in their subsystem, depended on changed binary files in another subsystem (e.g., another application).

Without this information, test reuse would not be prioritized to cover unchanged basic blocks in this application that depend on changed blocks in other subsystems. Without this consideration, tests designed in a previous version to test basic blocks in this version, would be less likely to be exercised, and the testing may not expose failures due to inter-subsystem dependence. By prioritizing tests of this application, based not only on changes made to this application, but on unchanged portions of this application depending on other subsystems, provides testing for integrating subsystems.

By marking these unchanged blocks in addition to new and changed basic blocks, tests that exercise unchanged marked blocks are considered for test development or reuse. A method prioritizes tests for changed, new, and unchanged marked blocks for a subsystem. This results in the intentional exercise of changed binary blocks that exist one or more steps down a dependency chain. By changing what blocks are marked (e.g., adding marked unchanged blocks) an existing test prioritization method produces inter-subsystem dependence aware test prioritization.

As stated above, FIG. 14 is an exemplary method 1400 for marking affected blocks, and propagating change thereby marking basic blocks that depend on affected blocks. This method is one example of how to mark changed blocks, new blocks, and unchanged blocks that depend on changed or new blocks. A test team exercising a subsystem can use the output of the method 1400, as input to a test prioritization method.

Thus, test prioritization proceeds with a different marked block input, and produces a different test prioritization output using an existing test prioritization method. Since a different algorithm is used to compute the affected basic blocks, the existing test prioritization produces an inter-subsystem aware test prioritization output heretofore unseen. The new prioritization, defines the impacted block set as a set of exit blocks of the binary that are connected to affected entry points. If an exit point is affected, all its dependent entry points are affected. Thus, the method is prioritizing tests that cover an affected entry point and an affected exit point over others. The test, which covers more entry and exit points, will get a higher priority. This addresses binaries that have been affected even if not a single block in the binary changed. The existing method was not designed to address such binaries. Another patent application, entitled, "Method and Apparatus For Prioritizing Software Tests," U.S. patent application Ser. No. 10/133,427, filed Apr. 29, 2002, is incorporated herein by reference.

Figure 19:
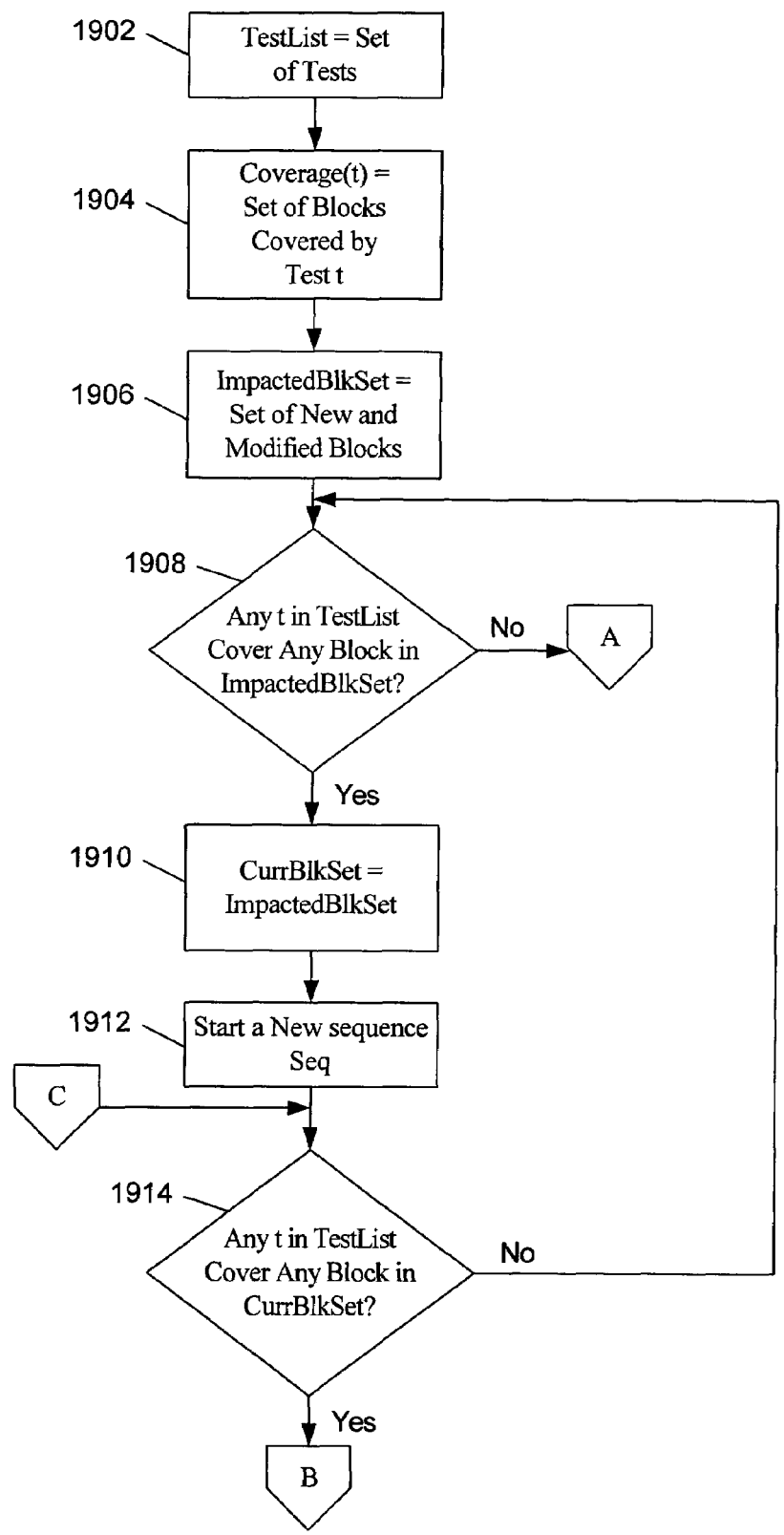
FIG. 19 a flow chart for a method of prioritizing tests based on block coverage.

FIG. 19 is an exemplary method 1900 for prioritizing tests for integration testing.

At 1902, the method receives a system definition and creates information about system dependencies.

At 1904, the method receives one or more changed binaries, and propagates changes according to the system dependencies.

At 1906, the method receives test coverage information, and prioritizes tests using coverage information and marked new blocks, changed blocks, and unchanged blocks shown affected during propagated change.

EXAMPLE 15

Exemplary Method for Block Coverage Prioritization

Figure 20:
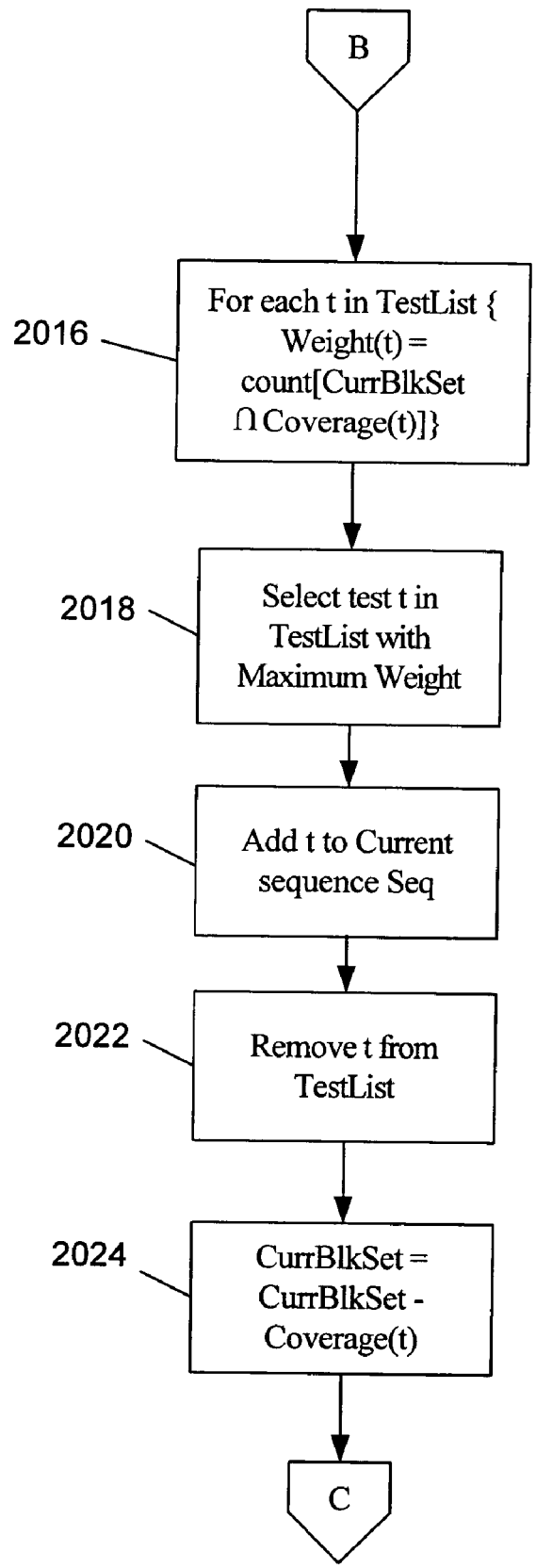
FIG. 20 is a continuation of the flow chart in FIG. 19.
Figure 21:
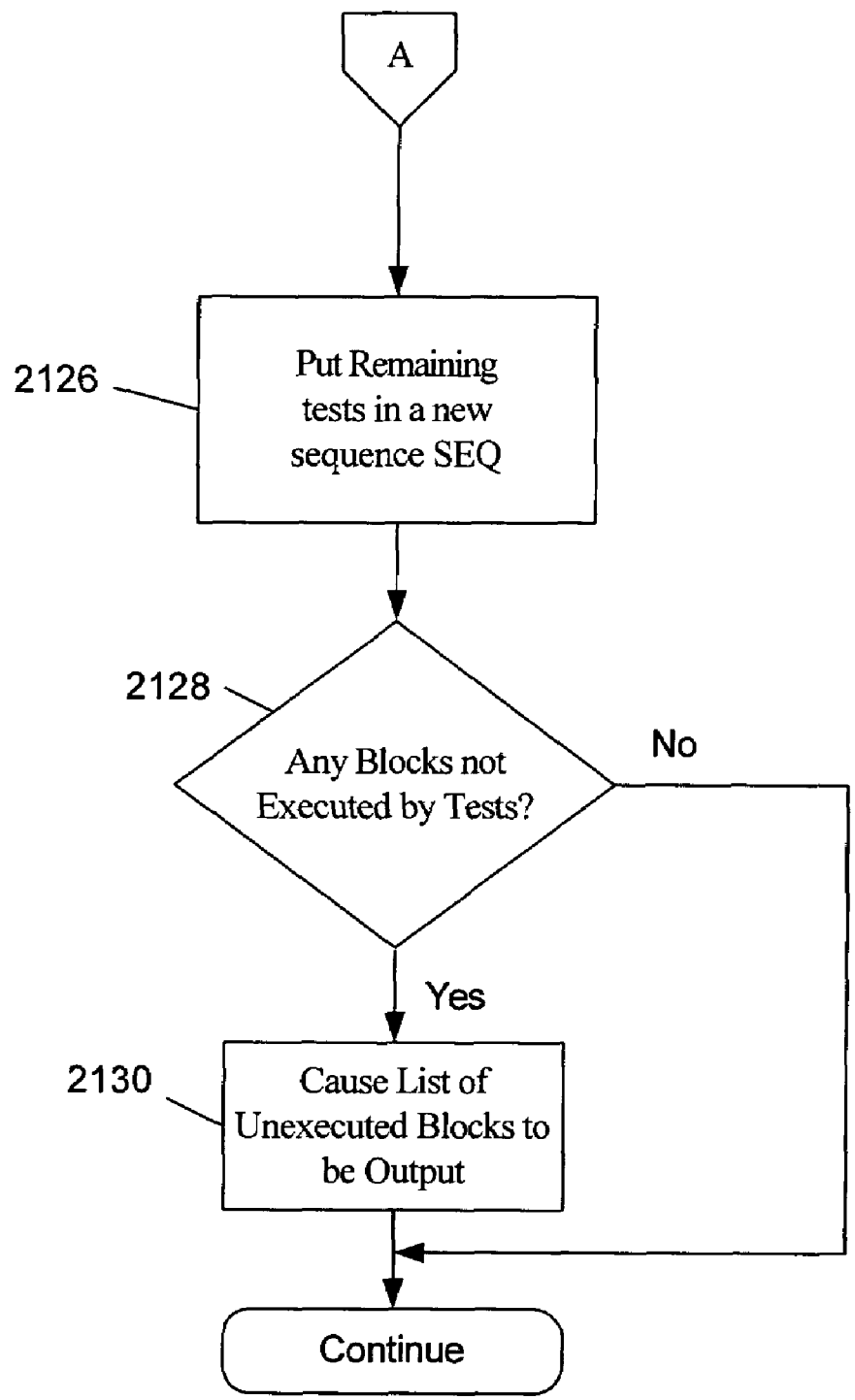
FIG. 21 is a continuation of the flow chart in FIG. 19.

In one example of prioritization, as shown in FIGS. 19-21, tests are prioritized based on new blocks, modified blocks, and unchanged blocks depending directly or indirectly on new or modified blocks covered by each test, as indicated by coverage indicators and impacted (e.g., marked affected) portions of the software.

Initialization occurs at steps 1902 through 1906.

At 1902, TestList is initialized to include a complete set of all of the tests.

At 1904, coverage(t) is set equal to the set of blocks covered by test t, where t corresponds to each of the software tests.

At 1906, ImpactedBlkSet is set equal to all of the new and modified blocks, along with the unchanged blocks depending on a chain of dependency leading to a new or changed block.

At 1908, a determination is made as to whether any tests t in TestList cover any block in ImpactedBlkSet. This can be performed by determining, for each test t, whether any of the blocks indicated by coverage(t) for any test t, also appear in ImpactedBlkSet. If so, execution continues at 1910.

At 1910, CurrBlkSet is set equal to ImpactedBlkSet and at 1912, a new test sequence is started.

At 1914, a determination is made as to whether any test t in TestList cover any block in CurrBlkSet. This determination can be made by comparing coverage(t) for the tests with the set of tests in TestList. If any of the tests t in TestList are found to cover any block in CurrBlkSet, then 2016 will be performed next. Otherwise, the determination at 1908 will be performed next.

At 2016, the weight, W(t), for each test t in TestList is computed. This is performed by counting the number of blocks that appear in CurrBlkSet that are covered by each test t in TestList.

At 2018, the test t having the maximum weight is selected.

At 2020, the selected test is added to the current sequence Seq.

At 2022, the selected test is removed from TestList and at 2024, the blocks covered by the selected test are removed from CurrBlkSet. The method continues at 1914, as described above.

Step 2126 is performed when, at 1908, it is determined that no test t in TestList covers any block in ImpactedBlkSet.

At 2126, any remaining tests are included in a new test sequence.

At 2128, a check is made to determine whether any blocks are not executed by any tests. If so, at 2130 a list of unexecuted blocks is output.

EXAMPLE 16

Exemplary Prioritization Trace

In one example, the method of FIGS. 19-21 is further explained with reference to FIG. 22. Tests T1 through T5 are the software tests under consideration in this example. For simplicity, the impacted block map shows all blocks as being impacted. For example, assume blocks 1, 3, and 7 are modified, block 4 is new, and blocks 2, 5, and 6 are unchanged but marked (e.g., as discussed in FIG. 14).

Initialization is performed according to steps 1902 through 1906. TestList is set to equal the tests (T1, T2, T3, T4, and T5). Coverage(T1) is set to blocks (1, 3, 5, 6, and 7). Coverage(T2) is set to blocks (2 and 4). Coverage(T3) is set to blocks (1, 3, 5, and 7). Coverage(T4) is set to block (7). Coverage(T5) is set to blocks (5, 6, and 7). ImpactedBlkSet is set to blocks (1, 2, 3, 4, 5, 6, and 7).

At 1908, a check is made to determine whether any of the tests in TestList cover any block in ImpactedBlkSet. At this point, all the tests in TestList cover blocks in ImpactedBlkSet. Therefore, 1910 will be performed next.

At 1910, CurrBlkSet is set equal to ImpactedBlkSet. At this point, CurrBlkSet is set equal to blocks (1, 2, 3, 4, 5, 6, and 7) and at 1912, a new test sequence is started. At this point the first test sequence, set 1, is started.

At 1914, a check is made to determine whether any of the tests in TestList cover any block in CurrBlkSet. At this point, all the tests in TestList cover blocks in CurrBlkSet. Therefore, 2016 will be performed next.

At 2016, the weight W will be computed for each test in TestList by counting the number of blocks covered for each test, wherein the covered block is also included in CurrBlkSet. At this point, CurrBlkSet=blocks (1, 2, 3, 4, 5, 6, and 7). Therefore, all of the covered blocks of tests T1 through T5 are counted. Thus, the weights for each test are 5 for T1, 2 for T2, 4 for T3, 1 for T4, and 3 for T5, as shown by the first column under weights in FIG. 22.

At 2018, comparing the weights, the weight 5 for T1 is determined to be the largest weight. Therefore, test T1 is selected and at 2020, test T1 is added to the current sequence, Set 1.

At 2022, test T1 is removed from TestList and at 2024, the blocks covered by test T1 are removed from CurrBlkSet. That is, TestList is now equal to tests (T2, T3, T4, and T5) and CurrBlkSet is now equal to blocks (2 and 4).

Step 1914 is performed next to determine whether any tests in TestList cover any blocks in CurrBlkSet. That is, do any of tests T2, T3, T4, and T5 cover blocks 2 or 4. Referring to FIG. 22, it can be seen that test T2 satisfies this condition. Therefore, 2016 will be performed next.

At 2016, weights will be calculated for tests T2, T3, T4, and T5. Test T2 covers blocks 2 and 4, which are included in CurrBlkSet. Therefore test T2 has a weight of 2. Tests T3 through T5 do not cover any blocks in CurrBlkSet, i.e., blocks 2 and 4, and therefore, have a weight of 0. The weights are shown in the second column from the right, under weights in FIG. 22.

At 2018, comparisons determine that test T2 has the largest weight, 2 and at 2020, test T2 is added to the current test sequence, Set 1.

At 2022, test T2 is removed from TestList and the tests covered by test T2 are removed from CurrBlkSet. That is, Testlist now equals (T3, T4 and T5) and CurrBlkSet now equals blocks ( ) (the null set). Step 1914 will be performed next.

Step 1914 is performed next to determine whether any tests in TestList cover any blocks in CurrBlkSet. That is, whether any of tests T3, T4, and T5 covers no blocks. Because this condition cannot be satisfied, 1908 will be performed next.

At 1908, a check is made to determine whether any tests in TestList cover any blocks in ImpactedBlkSet. That is, do any of tests T3, T4, and T5 cover any of blocks 1, 2, 3, 4, 5, 6, and 7. With reference to FIG. 22, one can easily observe that any of tests T3, T4 and T5 satisfy this condition. Therefore, 1910 will be performed next.

At 1910, CurrBlkSet is set to ImpactedBlkSet. That is, CurrBlkSet is set to blocks (1, 2, 3, 4, 5, 6, and 7). At 1912 a new sequence, set 2, is started.

Step 1914 is performed next to determine whether any tests in TestList covers any blocks in CurrBlkSet. That is, whether any of tests T3, T4, and T5 covers any of blocks 1, 2, 3, 4, 5, 6, and 7. With reference to FIG. 22, one can easily see that all of tests T3, T4 and T5 satisfy this condition. Therefore, 2016 will be performed next.

At 2016, weights will be calculated for tests T3, T4, and T5. Test 3 covers blocks 1, 3, 5 and 7 and therefore, a weight of 4 is computed for test T3. Test 4 covers block 7 and therefore, a weight of 1 is computed for test T4. Test 5 covers blocks 5, 6, and 7, and therefore, a weight of 3 is computed for test T5. The weights can be seen in the third column from the left, under weights in FIG. 22.

At 2018, test T3, having a weight of 4, is determined to be the test with the maximum weight and therefore, test T3 is selected. At 2020 test T3 is added to the current sequence, set 2, as can be seen in FIG. 22.

At 2022, test T3 is removed from TestList and at 2024, the blocks covered by test T3 are removed from CurrBlkSet. Thus, TestList is now equal to (T4 and T5) and CurrBlkSet is now equal to blocks (2, 4, and 6). Step 1914 will be performed next.

Step 1914 is performed next to determine whether any tests in TestList cover any blocks in CurrBlkSet. That is, do any of tests T4 and T5 cover any of blocks 2, 4, and 6. With reference to FIG. 22, one can easily see that test T5 satisfies this condition. Therefore, 2016 will be performed next.

At 2016, weights will be calculated for tests T4 and T5. Test T4 covers block 7, which is not included in CurrBlkSet. Therefore, T4 has a weight of 0. T5 covers blocks 5, 6, and 7, but only block 6 is included in CurrBlkSet. Therefore, T5 has a weight of 1. The weights can be seen in FIG. 22 as the fifth column from the left, under weights.

At 2018, test T5 is determined to be the test with a maximum weight of 1, as compared to T4, which has a weight of 0. Consequently, at 2020, test T5 is added to the current test sequence, set 2, as can be seen in FIG. 22.

At 2022, test T5 is removed from TestList and at 2024, block 6, the block covered by Test T5, is removed from CurrBlkSet. Thus, TestList now equals (T4) and CurrBlkSet now equals blocks ( ) (the null set). Step 1914 is performed next.

At 1914, a determination is made as to whether any tests in TestList cover any blocks in CurrBlkSet. Because CurrBlk equals the null set, this condition cannot be satisfied and 1908 will be performed next.

At 1908, a check is made to determine whether any tests in TestList cover any blocks in ImpactedBlkSet. That is, does test T4 cover any of blocks 1, 2, 3, 4, 5, 6, and 7? With reference to FIG. 22, one can easily observe that test T4 satisfy this condition with respect to block 7. Therefore, 1910 will be performed next.

At 1910, CurrBlkSet is set to ImpactedBlkSet. That is, CurrBlkSet is set to blocks (1, 2, 3, 4, 5, 6, and 7). At 1912 a new sequence, set 3, is started.

Step 1914 is performed next to determine whether any tests in TestList cover any blocks in CurrBlkSet. That is, whether any of test T4 covers any of blocks 1, 2, 3, 4, 5, 6, and 7. With reference to FIG. 22, one can easily see that test T4 satisfy this condition with respect to block 7. Therefore, 2016 will be performed next.

At 2016, a weight will be calculated for test T4. Test T4 covers block 7 and has a weight of 1. No other weight is computed for other tests. The weight can be seen in FIG. 22 as the fifth column from the left, under weights.

At 2018, test T4, having a weight of 1, is determined to be the test with the maximum weight. In fact, T4 is the only test with a weight. Therefore, test T4 is selected.

Figure 22:
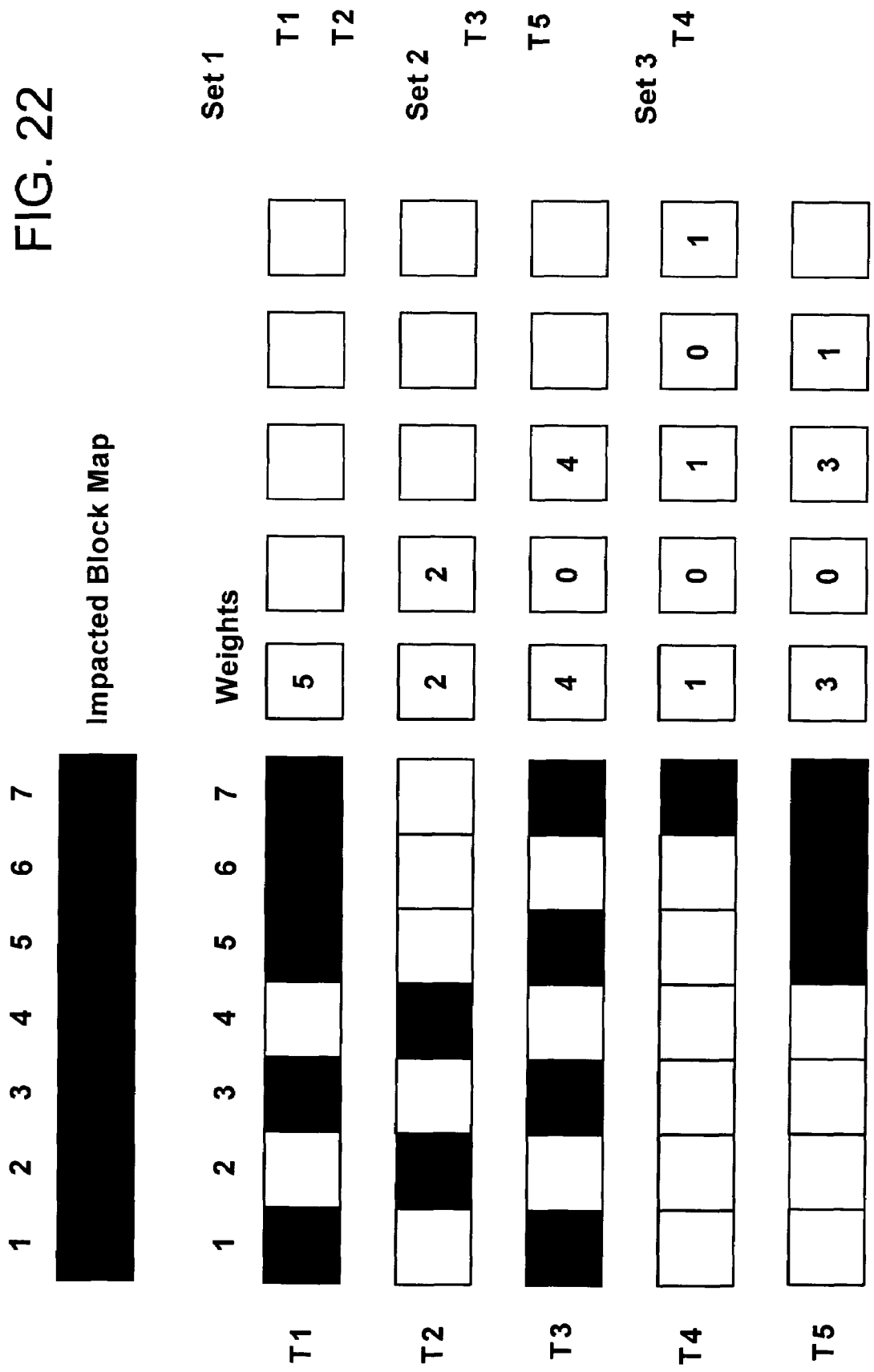
FIG. 22 is an example trace of the method of FIGS. 19-21.

At 2020, test T4 is added to the current sequence, set 3, as can be seen in FIG. 22.

At 2022, test T3 is removed from TestList and at 2024, the blocks covered by test T3 are removed from CurrBlkSet. Thus, TestList is now equal to ( ) (the null set) and CurrBlkSet is now equal to blocks (1, 2, 3, 4, 5, and 6). Step 1914 will be performed next.

At 1914, because no tests remain in TestList, the condition cannot be satisfied and 1908 is performed next.

At 1908, because no tests remain in TestList, this condition cannot be satisfied and 2126 is performed next.

At 2126, remaining tests are added to a new sequence; however, in this case, no tests remain.

At 2128, a check is made to determine whether any blocks are not executed as a result of performing any of the tests. If any blocks are not executed by the tests, then 2130 is performed to cause the list of unexecuted blocks to be output. However, in this example, all blocks are executed by the tests.

EXAMPLE 17

Exemplary Tie Breaking

In the above example of FIG. 22, a test with a maximum weight was always easy to determine; however, it is possible for two or more tests to have the same maximum weight. That is, two or more tests may have the same weight, which is greater than the weights of other tests under consideration. When this occurs, several other factors may be considered in order to break the tie.

Figure 23:
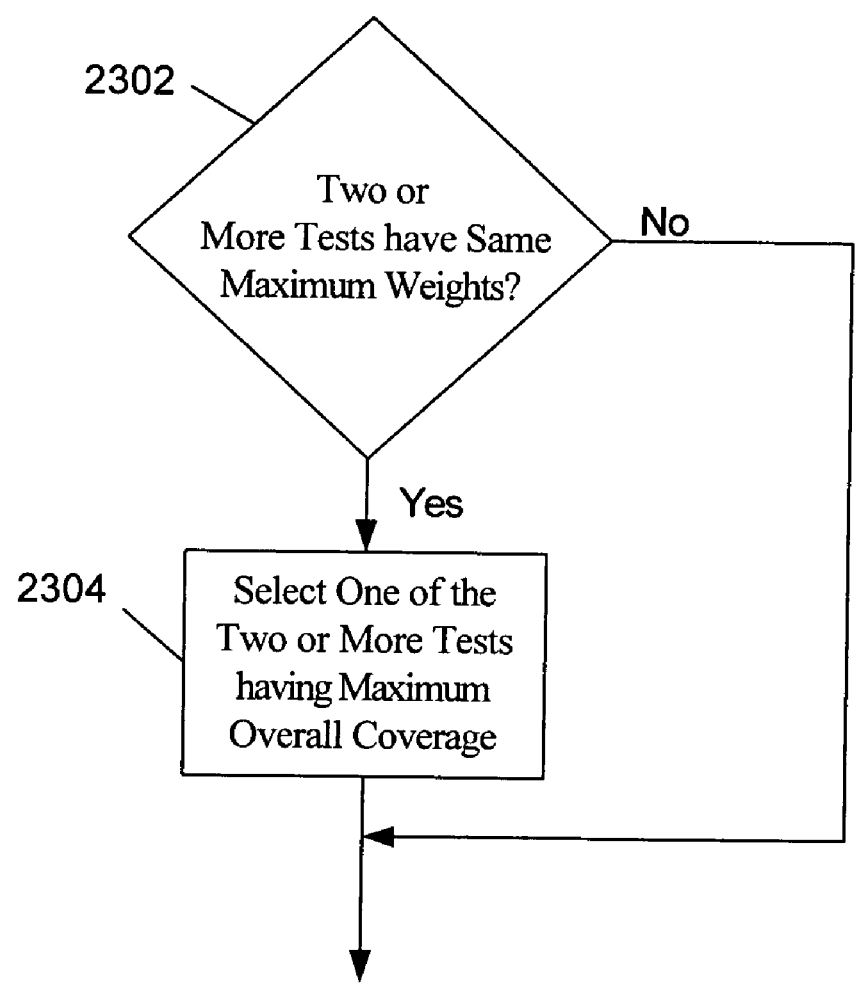
FIG. 23 is a flow chart for a method of maximum coverage tie breaking.

For example, information concerning maximum overall coverage of the software with regard to each software test may be maintained by using checkpoints and collecting coverage data. One of the two or more tests having the same weight and the maximum overall coverage may be selected to break the tie. FIG. 23 shows a portion of a flowchart for replacing step 2018 of the flowchart of FIG. 20 for implementing this variation.

At 2302, a check is performed to determine whether two or more tests have the same maximum weight. If the condition is true, 2304 is performed to determine which one of the two or more tests has the maximum overall coverage of the software. The one of the two or more tests having the maximum overall coverage is selected.

Figure 24:
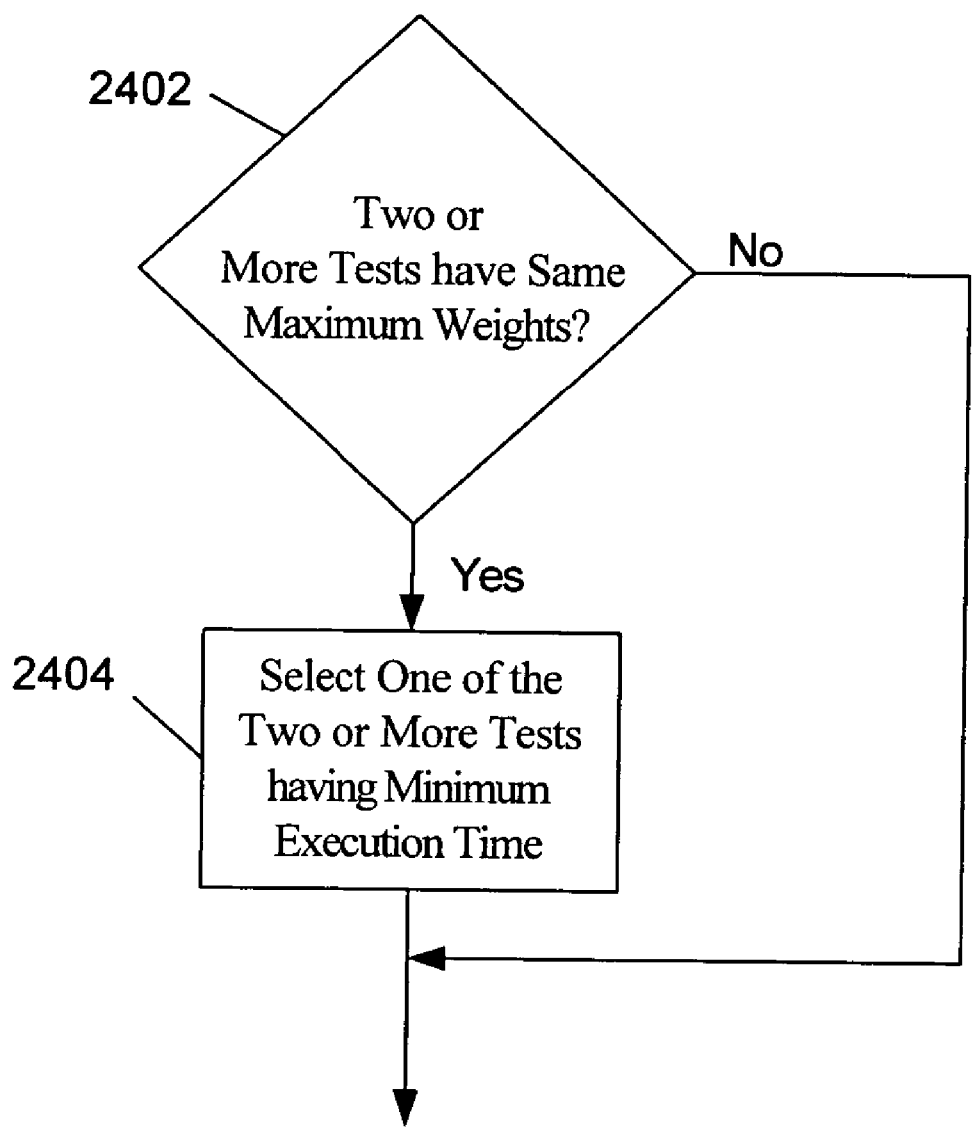
FIG. 24 is a flow chart for a method of execution time tie breaking.

In another variation, data concerning execution time of the tests may be maintained. When a tie occurs, the one of the two or more tied tests having the shortest execution time is selected. FIG. 24 shows a portion of a flowchart for replacing step 2018 of the flowchart of FIG. 20 for implementing this variation.

At 2402, a check is performed to determine whether two or more tests have the same maximum weight. If the condition is true, 2404 is performed to determine which one of the two or more tests has the shortest execution time. The one of the two or more tests having the shortest execution time is selected.

EXAMPLE 18

Exemplary Method for Arc Coverage Prioritization

Figure 25:
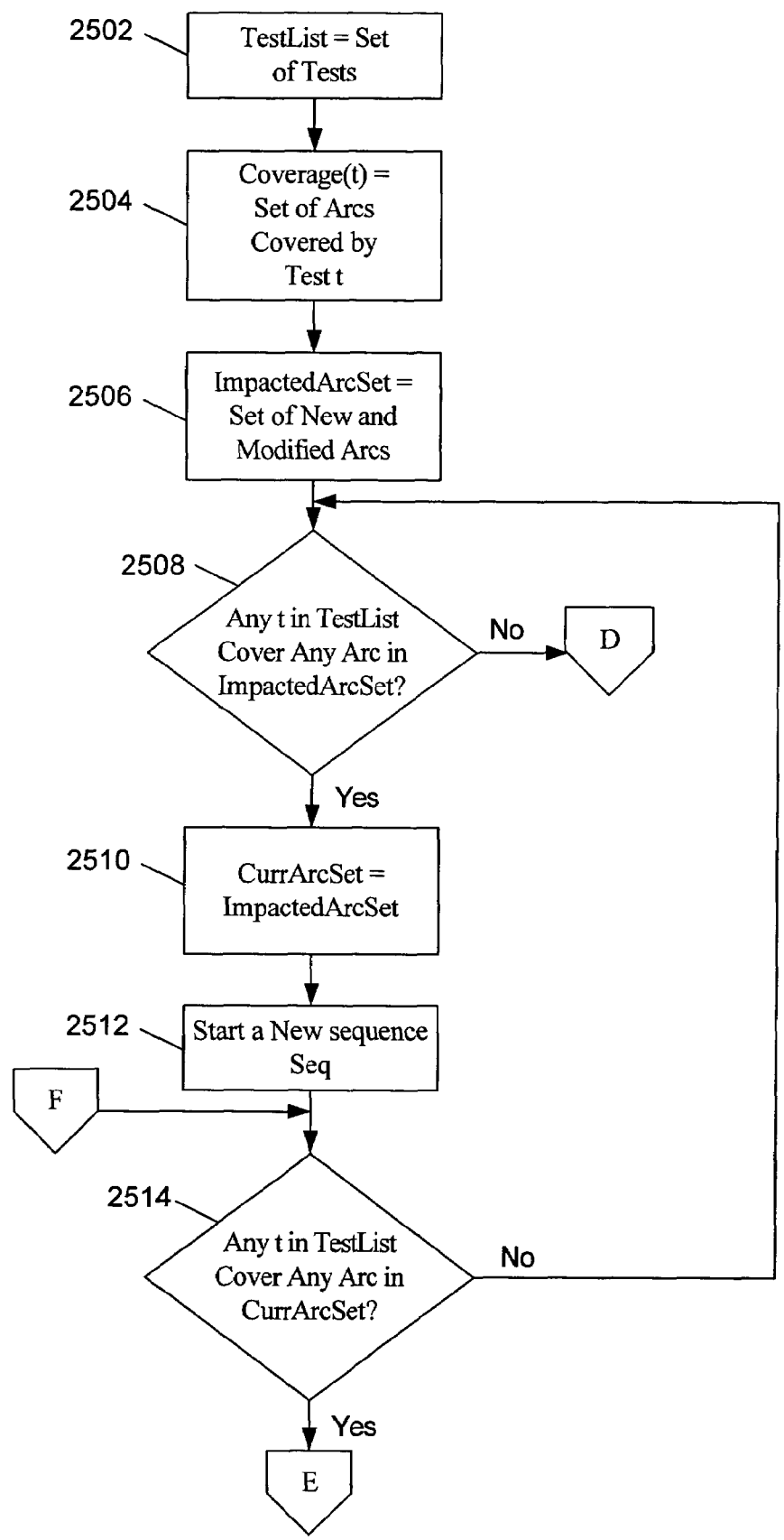
FIG. 25 a flow chart for a method of prioritizing tests based on arc coverage.
Figure 26:
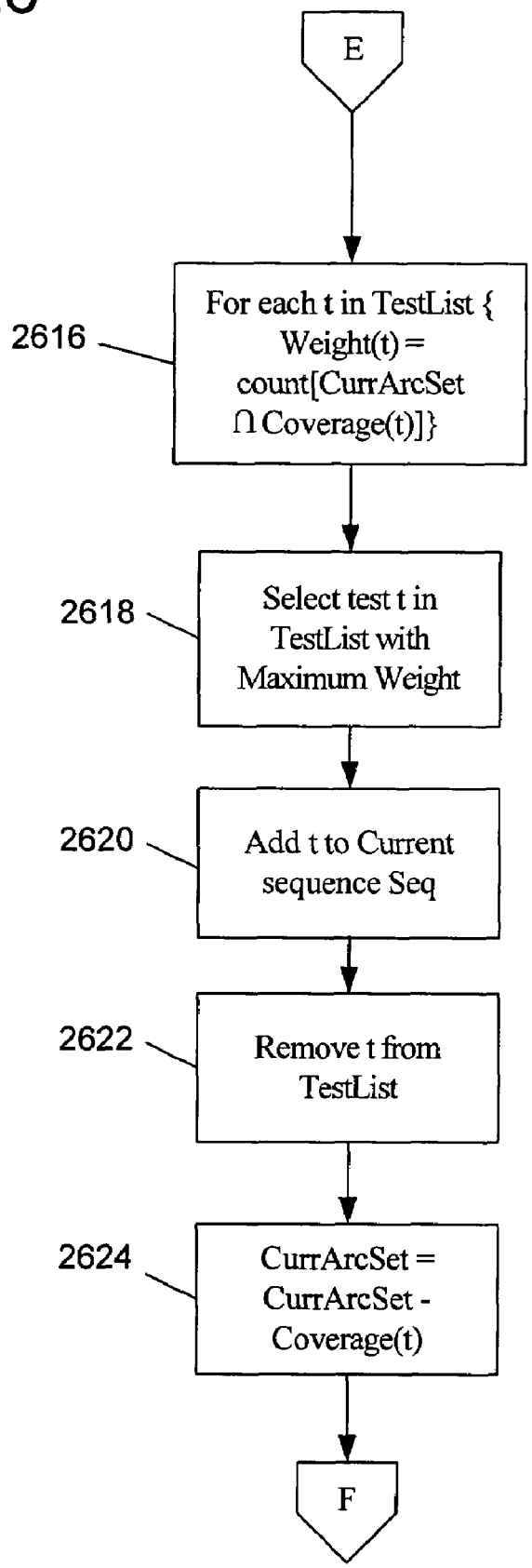
FIG. 26 is a continuation of the flow chart in FIG. 25.
Figure 27:
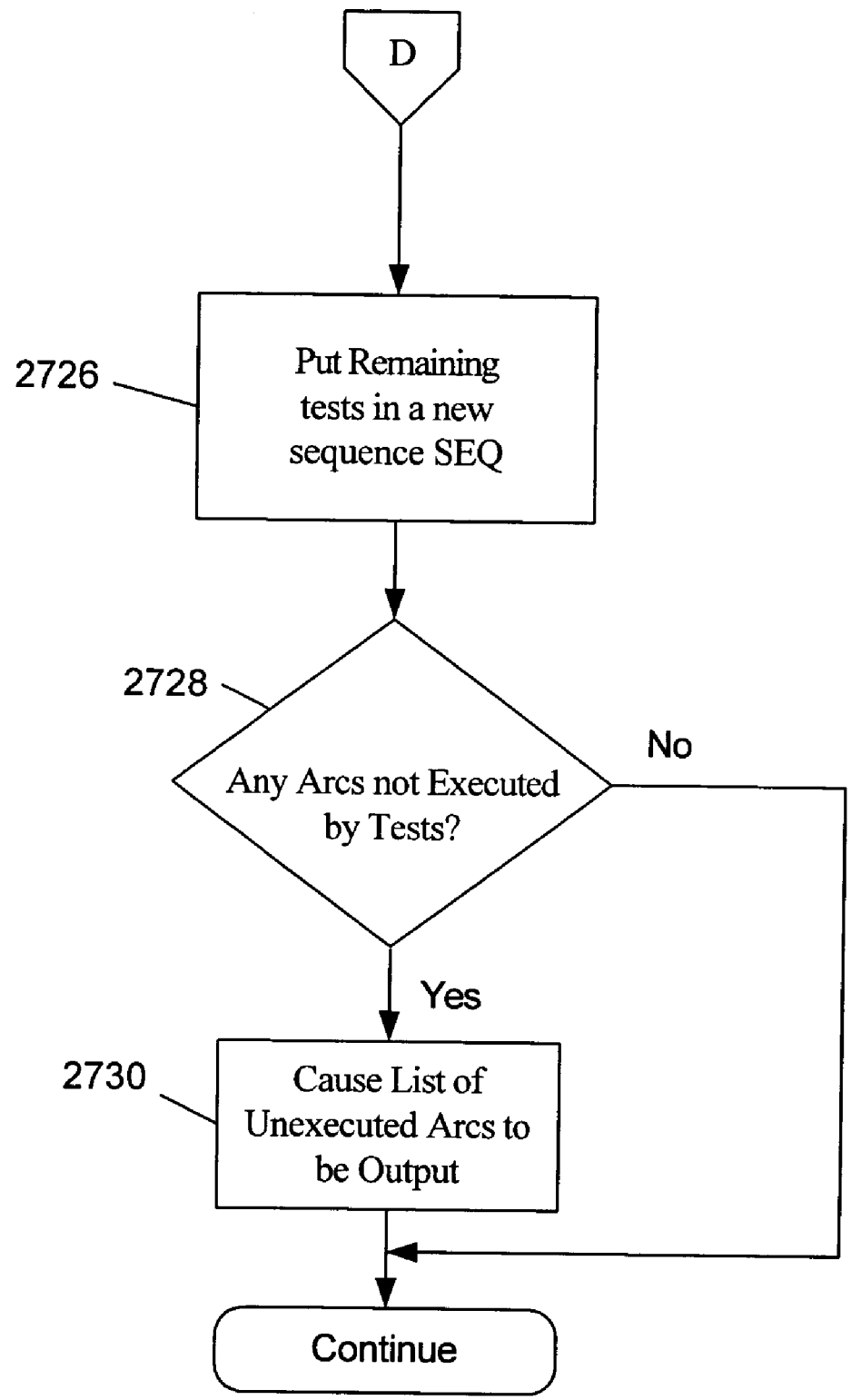
FIG. 27 is a continuation of the flow chart in FIG. 25.

In FIGS. 25-27, tests are prioritized based on new or modified arcs along with unchanged arcs in a dependency chain covered by each test, as indicated by coverage indicators and an indication of impacted portions of the software. Initialization occurs at steps 2502 through 2506.

At 2502, TestList is initialized to include a complete set of all of the tests.

At 2504, coverage(t) is set equal to the set of arcs covered by test t, where t corresponds to each of the software tests.

At 2506, ImpactedArcSet is set equal to all of the new and modified blocks.

At 2508, a determination is made as to whether any tests t in TestList covers any arc in ImpactedBlkSet. This step can be performed by determining, for each test t, whether any of the arcs indicated by coverage(t) for any test t, also appear in ImpactedArcSet. If so, execution continues at 2510.

At 2510, CurrArcSet is set equal to ImpactedArcSet and at 2512, a new test sequence is started.

At 2514, a determination is made as to whether any test t in TestList cover any block in CurrArcSet. This determination can be made by comparing coverage(t) for the tests with the set of tests in TestList. If any of the tests t in TestList are found to cover any arc in CurrArcSet, then 2616 will be performed next. Otherwise, the determination at 2508 will be performed next.

At 2616, the weight, W(t), for each test t in TestList is computed by counting the number of arcs that appear in CurrArcSet that are covered by each test t in TestList.

At 2618, the test t having the maximum weight is selected.

At 2620, the selected test is added to the current sequence Seq.

At 2622, the selected test is removed from TestList and at 2624, the arcs covered by the selected test are removed from CurrArcSet. The method continues at 2514, as described above.

Step 2726 is performed when, at 2508, it is determined that no test t in TestList covers any arc in ImpactedArcSet.

At 2726, any remaining tests are included a new test sequence.

At 2728, a check is made to determine whether any blocks are not executed by any tests. If blocks are not executed by the tests, at 2730 a list of unexecuted blocks is output.

The tie breaking strategies mentioned above may also be applied to arc coverage. For example, if two or more tests have the same maximum weight, other factors, such as maximum overall test coverage or minimum execution time may be considered and a selection made among the arcs having the same maximum weight, as similarly described previously.

EXAMPLE 19

Exemplary Weighted Coverage

It will be appreciated by one skilled in the art that any performance-based criterion may be used in the tie breaking procedure described above.

In a variation of the illustrative arc coverage and block coverage described above, weighting may be modified to include other factors. For example, performance data may be used to add to the computed weight for each of the software tests. Performance data may be collected during execution of the software tests in a previous version of the software. When determining coverage of the blocks or arcs by the software tests, if a block or arc is determined to be in a portion of the program that is performance critical, a performance critical indicator may be stored with the block or arc coverage information for the software test. Thus, when a test is determined to cover a block or arc that is in a performance critical portion of the software, a predefined value may be added to the weight for the test.

As an example of this variation, a portion of the software may be considered to be performance critical if the portion of the software is executed above a certain percentage of the time, for example, 80%. When this occurs, a weight of, for example, 5 may be added to the test's weight.

As another example, different categories of performance criticality may be defined, such as high, medium and low. These may be defined as follows: high-executed >90% of the time, medium-executed >80% and ≦90%, and low-executed ≦80% of the time and >70% of the time. Weights such as 5 for high, 3 for medium, and 1 for low may be added to the weights of tests that cause software within the above performance critical categories to be executed. Of course, this variation is not limited to the above categories and weights. Other categories and weights may also be used.

Another factor that may be used in weighing the tests in the above embodiments is the rate of fault detection for each test. Historical information pertaining to fault detection may be maintained for each of the software tests. A weight may be assigned for each given rate of fault detection. For example, a weight of 5 may be added for a test that historically has a high rate of fault detection, a weight of 3 may be added for a test that has a medium rate of faulty detection, and a weight of 1 may be added to tests that have a low rate of fault detection. Of course, other categories may be used, as well as more or fewer categories. Further, other numeric values may be used for weights for each category. It will be appreciated that the various criteria may take on different weights in a combined weighting calculation. For example, a particular weighting function may be defined combining various criterions such as those discussed above using weight coefficients to generate a weight for use in test prioritization.

EXAMPLE 20

Exemplary Basic Block Discovery

A method used to identify basic blocks in a binary file is discussed with reference to FIGS. 28-30. This method is considered with respect to Davidson et al., "Method and System For Improving The Locality of Memory References During Execution of a Computer Program," U.S. Pat. No. 6,292,934. For example, if binary blocks are a desirable logical abstraction, a binary file dependency determiner could identify basic blocks using the methods discussed with reference to FIGS. 28-30. However, other methods can be used to discover basic blocks, procedures, and other logical abstractions. For example, procedures and functions are often available in symbol tables, and binary files are often listed in directories. Once logical abstractions are discovered, whatever level of granularity of information that is desired for the logical abstraction, is generated and stored in a record (e.g., 708, 800, etc.).

Figure 28:
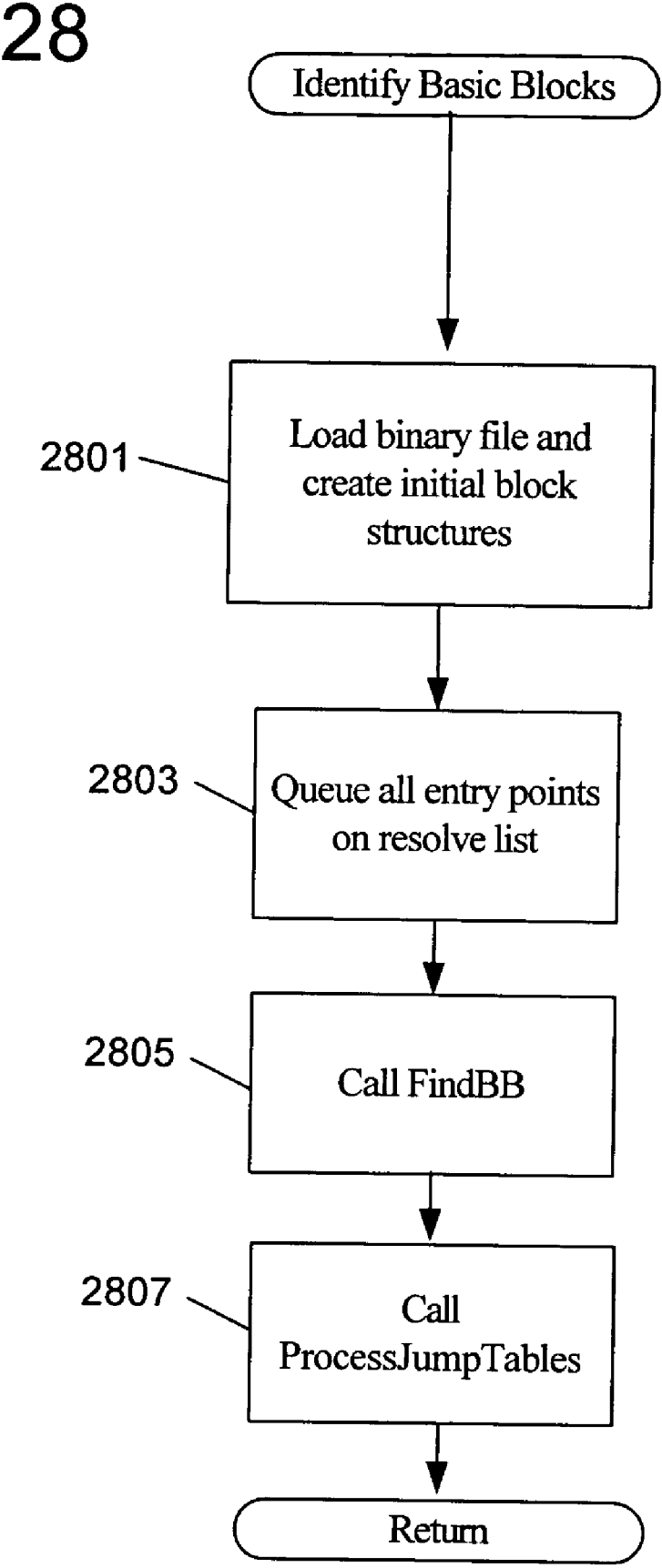
FIG. 28 is a flow chart for a method for identifying basic block in a binary file.

FIG. 28 is a flow chart of a method for identifying basic blocks. The method gathers information such as entry point addresses, and then analyzes a binary file using this information.

At 2801, the method loads a binary file into memory.

At 2803, the method gathers information that includes addresses known to be instructions, and queues these addresses on a resolve list for later examination. These addresses can be gathered from any available sources, such as entry points, export entry tables, symbolic debug information, and even user input. After the known instruction addresses are gathered, the basic block identification process begins.

At 2805, a find basic block method (FindBB) retrieves an address from the resolve list, disassembles the instruction at that address, and then identifies all basic blocks that are encountered during the disassembly process. The FindBB method is explained in more detail with reference to FIG. 29. FindBB continues retrieving addresses and disassembling the addresses until the resolve list is empty. When the resolve list is empty, there are no known instruction addresses left to disassemble.

At 2807, after FindBB has identified all basic blocks that are encountered during the disassembly process, the method begins analyzing jump tables to identify the remaining basic blocks not associated with known addresses in the resolve list. Each entry in a jump table contains an address of an instruction. Jump tables can be generated by a compiler and typically have the form shown in Table A.

TABLE A

| |
|---|
| JMP *(BaseAddress + index) |
| {pad bytes} |
| BaseAddress &(TARGET1) |
| &(TARGET2) |
| . |
| . |
| . |
| &(TARGETn) |
| {pad bytes} |
| TARGET1 . |
| . |
| . |
| {pad bytes} |
| TARGETn . |
| . |
| . |

Pad bytes appear at various locations within the code shown in Table A. For performance reasons, a compiler program typically inserts pad bytes to align code and data to a specific address. As shown, a jump table containing "n" entries is located at the label "BaseAddress." The starting address of a jump table is its base address. The instruction "JMP *(BaseAddress+index)" jumps to one of the "Targetn" labels indirectly through the jump table. The "index" indicates which entry in the jump table to jump through. A jump table may also be used by an indirect call instruction. Also, as shown above, the first entry in a jump table typically points to code that is located immediately after the jump table and a jump table typically follows a basic block having an indirect branch exit instruction. Due to the complexities and problems associated with jump table analysis, the method uses special processing for jump tables.

A process jump table method (ProcessJumpTable) identifies instructions referenced by jump table entries. As new instruction addresses are identified by the jump table analysis, ProcessJumpTable calls FindBB to disassemble the instructions at those addresses and identify all basic blocks that are encountered during the disassembly process. The routine ProcessJumpTable is explained below in more detail with reference to FIG. 30.

Figure 29:
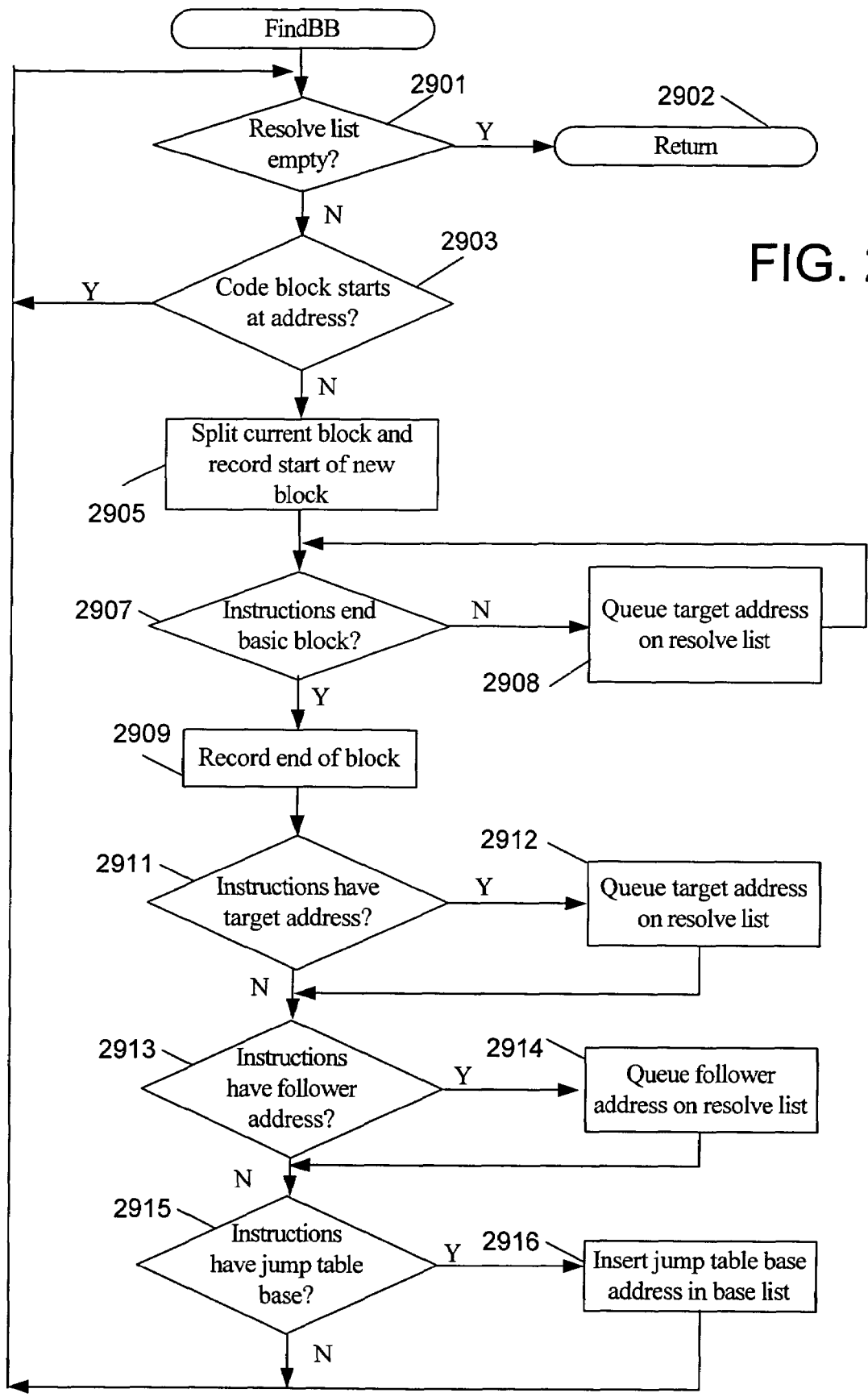
FIG. 29 is a flow chart for a method for finding basic blocks in a binary file.

FIG. 29 is a flow chart of the FindBB method discussed with respect to FIG. 28 at 2805.

At 2901, FindBB determines whether the resolve list contains any addresses. As explained above, known instruction addresses are stored on the resolve list. If the resolve list does not contain any addresses, then FindBB is done.

At 2903, if the resolve list is not empty, then FindBB removes an instruction address from the resolve list and scans a list of known code blocks to determine whether a known code block starts at this instruction address. The list of known code blocks contains addresses of labeled instructions. For example, referring to the above example code for a jump table, the labels "Target1" and "Targetn" indicate the start of code blocks. If a block starts at the instruction address, there is no need to re-examine the address so FindBB loops back to step 2901. If a known code block does not start at the instruction address, then the instruction address must be the start of a new code block.

At 2905, the method splits the known or unknown code block that contains the instruction address and records the instruction address as the start of a new basic block.

At 2907 and 2908, the method sequentially disassembles the instructions that follow the start of the new basic block until a transfer exit instruction is found. A transfer exit instruction is any instruction that may cause a transfer of control to another basic block. Examples of such exit instructions include branches, conditional branches, traps, calls, and returns.

At 2909, when a transfer exit is found, the method records the address of the exit instruction as the end of the new code block. All addresses within range of the previously identified block that follow the exit instruction of the newly identified basic block become another new basic block.

At 2911-2914, the method determines the follower and target addresses, if any, for the new code block, and queues the follower and target addresses on the resolve list for later examination. A follower address is the address of an entrance instruction of a "fall through" block; that is, no branch or jump instruction is needed to access the block. A target address is the address of an instruction for a block of code that is the destination of a branch or jump instruction. If the exit instruction for the new block is an indirect jump or call instruction, then FindBB determines whether a jump table may start at the base address of the instruction.

At 2915 and 2916, because jump tables require special handling, the method stores the base address of the termination instruction in a base list. Each entry in the base list contains an address and an index into a jump table. The entries in the base list are sorted by index value so that the first entry in the list has the lowest index. Whenever a base address is added to the base list, the corresponding index value is set to zero. The index value corresponds to the entry in the jump table that will be processed next as discussed below. The method then loops back to step 2901 to examine the next address on the resolve list, if more addresses exist.

As mentioned above, the method uses special processing to identify the extent of a jump table. This special processing includes processing all jump tables in a breadth-first manner. ProcessJumpTable processes the first entry in every jump table before processing the second or subsequent entries in any jump table. When FindBB disassembles an instruction that references a jump table, the base address of the jump table is put on the base list (see step 2916 of FIG. 29).

Figure 30:
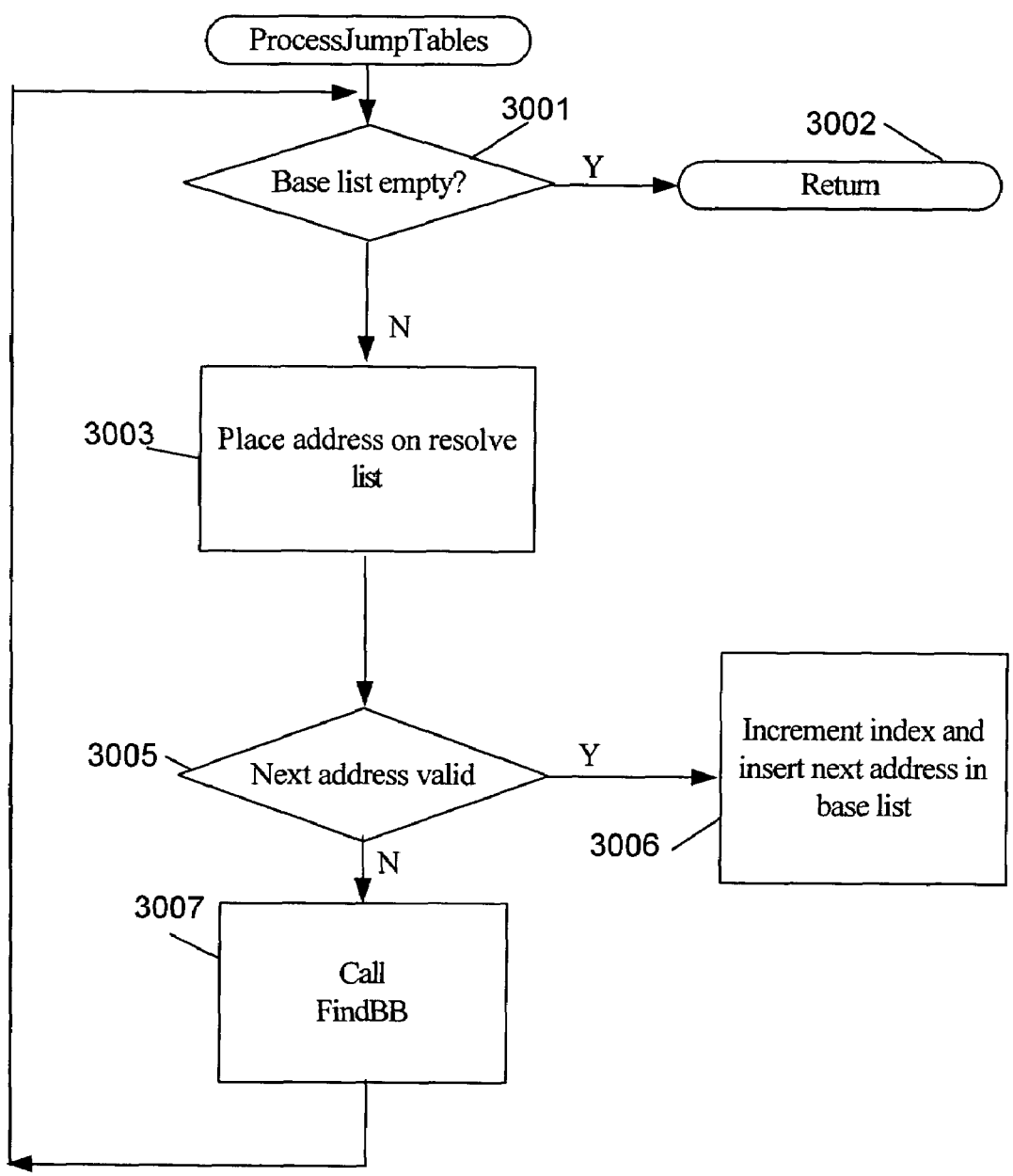
FIG. 30 is a flow chart for a method for processing jump tables to help find basic blocks in a binary file.

FIG. 30 is a flow chart diagram of the ProcessJumpTable method discussed with respect to FIG. 28 at 2807.

At 3001, the ProcessJumpTable method determines whether the base list contains any entries. If the base list does not contain any entries, then ProcessJumpTable ends 3002. If the base list contains one or more entries, then, in step 3003, ProcessJumpTable places the address pointed to by the first entry on the resolve list. This address is determined by adding the contents of the base address to the index value. In steps 3005 and 3006, ProcessJumpTable determines whether the end of the jump table has been reached, and, if not, places the next entry in the jump table onto the base list with the index value incremented. The end of a jump table has been reached when the next address is a pad byte or the entrance instruction of a code block.

At 3007, ProcessJumpTable calls the FindBB method. FindBB may then identify the start of additional jump tables. ProcessJumpTable processes the newly identified jump tables to the same depth as the other jump tables because the base address of a newly identified jump tables is added to the base list in index order. This breadth-first processing of jump tables tends to maximize the chances of identifying a code block that immediately follows a jump table. In this way, ProcessJumpTable ceases processing a jump table when the next address following a jump table entry contains the entrance instruction of a basic block.

Each basic block identified has associated data that includes an address, a size, a unique identifier known as a block identifier ("BID"), a follower block identifier ("BID-Follower"), and target block identifier ("BIDTarget"). Each BIDFollower field contains the BID of a block to which control will pass if a block exits with a fall through condition. Each BIDTarget field contains the BID of a block to which control will pass if a block exits with a branch condition. Referring to example basic blocks shown below in Table B, block "B1" has a size of 17 bytes. Additionally, block "B2" is the follower block of block "B1" and block "B10" is the target block of block "B1." A "nil" value stored in either the BID-Follower or BIDTarget fields indicates no follower or target block, respectively.

TABLE B

| Address | Instruction | Assembled Instruction |
|---|---|---|
| Id: B1 Size: 0x11(17) BidFollower: B2 BidTarget: B10 | | |
| 0075FE00 | 53 | push ebx |
| 0075FE01 | 56 | push esi |
| 0075FE02 | 57 | push edi |
| 0075FE03 | 8B 44 24 14 | mov eax,dword ptr [esp+14] |
| 0075FE07 | 8B F8 | mov edi,eax |
| 0075FE09 | 8B 74 24 18 | mov esi,dword ptr [esp+18] |
| 0075FE0D | 85 F6 | test esi,esi |
| 0075FE0F | 74 30 | je 0075FE41 |
| Id: B2 Size: 0xf(15) BidFollower: B3 BidTarget: nil | | |
| 0075FE11 | C7 06 FF FF FF | mov dword ptr [esi],FFFFFF |
| 0075FE17 | 8B 4C 24 10 | mov ecx,dword ptr [esp+10] |

TABLE B-continued

| Address | Instruction | Assembled Instruction |
|---|---|---|
| 0075FE1B | BB 26 00 00 00 | mov ebx,00000026 |
| | Id: B3 Size: 0x4(4) BidFollower: B4 BidTarget: B8 | |
| 0075FE20 | 38 19 | cmp byte ptr [ecx],b1 |
| 0075FE22 | 75 11 | jne 0075FE35 |
| | Id: B4 Size: 0x5(5) BidFollower: B5 BidTarget: B7 | |
| 0075FE24 | 83 3E FF | cmp dword ptr [esi],FF |
| 0075FE27 | 75 0B | jne 0075FE34 |
| | Id: B5 Size: 0X5(5) BidFollower: B6 BidTarget: B7 | |
| 0075FE29 | 38 59 01 | cmp byte ptr [ecx+0.1],b1 |
| 0075FE2C | 74 06 | je 0075FE34 |
| | Id: B6 Size: 0x6(6) BidFollower: B7 BidTarget: nil | |
| 0075FE2E | 8B D0 | mov edx,eax |
| 0075FE30 | 2B D7 | sub edx,edi |
| 0075FE32 | 89 16 | mov dword ptr [esi],edx |
| | Id: B7 Size: 0x1(1) BidFollower: B8 BidTarget: nil | |
| 0075FE34 | 41 | inc ecx |
| | Id: B8 Size: 0x9(9) BidFollower: B9 BidTarget: B13 | |
| 0075FE35 | 8A 11 | mov dl,byte ptr [ecx] |
| 0075FE37 | 88 10 | mov byte ptr [eax],dl |
| 0075FE39 | 41 | inc ecx |
| 0075FE3A | 84 D2 | test dl,dl |
| 0075FE3C | 74 1C | je 0075FE5A |
| | Id: B9 Size: 0x3(3) BidFollower: nil BidTarget: B3 | |
| 0075FE3E | 40 | inc eax |
| 0075FE3F | EB DF | jmp 0075FE20 |
| | Id: B10 Size: 0xd(13) BidFollower: B11 BidTarget: B13 | |
| 0075FE41 | 8B 4C 24 10 | mov ecx,dword ptr [esp+10] |
| 0075FE45 | 8A 11 | mov dl,byte ptr [ecx] |
| 0075FE47 | 88 10 | mov byte ptr [eax],dl |
| 0075FE49 | 41 | inc ecx |
| 0075FE4A | 84 D2 | test dl,dl |
| 0075FE4C | 74 0C | je 0075FE5A |
| | Id: B11 Size: 0x2(2) BidFollower: B12 BidTarget: nil | |
| 0075FE4E | 8B FF | mov edi,edi |
| | Id: B12 Size: 0xa(10) BidFollower: B13 BidTarget: B12 | |
| 0075FE50 | 40 | inc eax |
| 0075FE51 | 8A 11 | mov dl,byte ptr [ecx] |
| 0075FE53 | 88 10 | mov byte ptr [eax],dl |
| 0075FE55 | 41 | inc ecx |
| 0075FE56 | 84 D2 | test dl,dl |
| 0075FE58 | 75 F6 | jne 0075FE50 |
| | Id: B13 Size: 0x8(8) BidFollower: nil BidTarget: nil | |
| 0075FE5A | 2B C7 | sub eax,edi |
| 0075FE5C | 5F | pop edi |
| 0075FE5D | 5E | pop esi |
| 0075FE5E | 5B | pop ebx |
| 0075FE5F | C2 0C 00 | ret 000C |

The pseudo code for a method used to identify basic blocks is shown below in Table C. The pseudo code illustrates a situation with multiple entry points. The address of the entry points are stored in the table named EPTable.

TABLE C

EntryPointTable (EPTable)-each entry contains an entry point into code being disassembled
BaseAddressTable (BA Table)-each entry contains a base address of a jump table and an index of the next entry to be processed. The entries in the table are sorted by index.
    IdentifyBB ( )
    { while (EPTable != empty)
        nextEntryPoint = GetEPTable( )

TABLE C-continued

FindBB (nextEntryPoint)
    endwhile
    while (BA Table != empty)
        GetBA Table (baseAddress, index)
        FindBB (*(baseAddress+index))
        PutBA Table (baseAddress, index + 1)
    endwhile
}
FindBB(Address)
{    startBB (address
    nextAddrews = address
    do
        CurAddress = nextAddress
        disassemble instruction at curAddress
        nextAddress = nextAddress + 1
    while (instruction != end of BB)
    endBB(curaddress)
    if instruction is a jump
        FindBB(address of target of instruction)
    if instruction is conditional jump
        FindBB(address of target of instruction)
        FindBB(address of follower of instruction)
    if instruction is indirect jump or call
        putBA Table(BaseAddress in instruction, 0)
}
PutBA Table(Base Address, index)
{    if (BaseAddress is a fixup &&
        BaseAddress is in code or unknown section
            store (BaseAddress, index) in BA Table in sorted order
by index
}
GetBA Table(Base Address, index)
{    if (BaseAddress is a fixup &&
        BaseAddress is in code or unknown section
            store (BaseAddress, index) in BA Table in sorted order
by index
}
GetBA Table(BaseAddress, index)
{    retrieve BaseAddress with lowest index from BA Table
}
GetEPTable (address)
{    retrieve address stored in next entry of EPTable
}

EXAMPLE 21

Integrating and Segregating Described Technologies

Information is collected using the described technologies, and is available for any number of uses, for example, in any number of graphical or textual presentations, or for computing testing needs, making management decisions, testing, and etc. In one example, the technologies of mining dependencies and exposing or using them for any reason, is an integrated program. In another example, the described technologies are divided into cooperating methods, programs or processes. For example, a framework determines dependencies (e.g., 202), and a tool is written to obtain and display information. The methods and systems discussed in the context of the framework could be further divided into separate but cooperating programs, methods, processes, etc., as will be understood by those skilled in the art. In other examples, the described technologies are integrated into one program. Boundaries of code labor do not limit the described technologies.

EXAMPLE 22

Computing Environment

Figure 31:
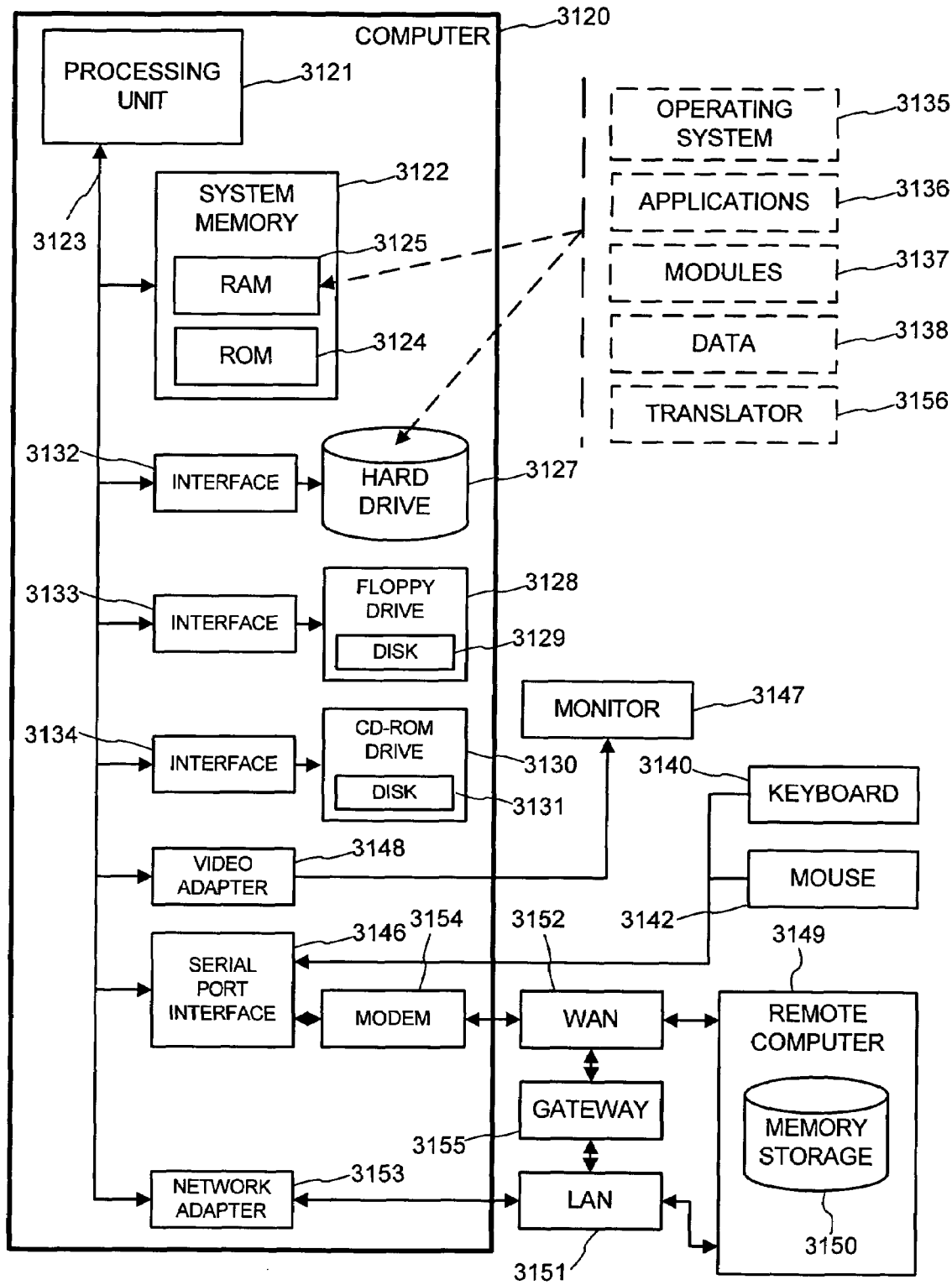
FIG. 31 is a block diagram of a distributed computer system implementing the described technologies.

FIG. 31 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc., that perform particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 31, an exemplary system for implementation includes a conventional computer 3120 (such as personal computers, laptops, servers, mainframes, and other variety computers) includes a processing unit 3121, a system memory 3122, and a system bus 3123 that couples various system components including the system memory to the processing unit 3121. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 3121.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 3124 and random access memory (RAM) 3125. A basic input/output system (BIOS), containing the basic routines that help to transfer information between elements within the computer 3120, such as during start-up, is stored in ROM 3124.

The computer 3120 further includes a hard disk drive 3127, a magnetic disk drive 3128, e.g., to read from or write to a removable disk 3129, and an optical disk drive 3130, e.g., for reading a CD-ROM disk 3131 or to read from or write to other optical media. The hard disk drive 3127, magnetic disk drive 3128, and optical disk drive 3130 are connected to the system bus 3123 by a hard disk drive interface 3132, a magnetic disk drive interface 3133, and an optical drive interface 3134, respectively. The drives and their associated computer-readable media provide nonvolatile storage of data, data structures, computer-executable instructions, etc. for the computer 3120. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 3125, including an operating system 3135, one or more application programs 3136, other program modules 3137, and program data 3138; in addition to an implementation 3156.

A user may enter commands and information into the computer 3120 through a keyboard 3140 and pointing device, such as a mouse 3142. These and other input devices are often connected to the processing unit 3121 through a serial port interface 3146 that is coupled to the system bus, but may be connected by other interfaces, such as a parallel port, game port or a universal serial bus (USB). A monitor 3147 or other type of display device is also connected to the system bus 3123 via an interface, such as a video adapter 3148. In addition to the monitor, computers typically include other peripheral output devices (not shown), such as speakers and printers.

The computer 3120 operates in a networked environment using logical connections to one or more remote computers, such as a remote computer 3149. The remote computer 3149 may be a server, a router, a peer device or other common network node, and typically includes many or all of the elements described relative to the computer 3120, although only a memory storage device 3150 has been illustrated. The logical connections depicted include a local area network (LAN) 3151 and a wide area network (WAN) 3152. Such networking environments are commonplace in offices, enterprise-wide computer networks, intranets and the Internet.

When used in a LAN networking environment, the computer 3120 is connected to the local network 3151 through a network interface or adapter 3153. When used in a WAN networking environment, the computer 3120 typically includes a modem 3154 or other means for establishing communications (e.g., via the LAN 3151 and a gateway or proxy server 3155) over the wide area network 3152, such as the Internet. The modem 3154, which may be internal or external, is connected to the system bus 3123 via the serial port interface 3146. In a networked environment, program modules depicted relative to the computer 3120, or portions thereof, may be stored in the remote memory storage device. It will be appreciated that the network connections shown are exemplary and other means of establishing a communications link between the computers may be used.

Alternatives

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. Techniques from one example can be incorporated into any of the other examples.

In view of the many possible embodiments to which these principles apply, it should be recognized that the detailed embodiments are illustrative only and should not be taken as limiting the broader scope of this disclosure represents to those skilled in the arts. Rather, we claim all that comes within the scope and spirit of the following claims and equivalents thereto.

We claim:

1. A method comprising:

for each binary file out of a set of binary files:

determining dependency information about the binary file comprising entry and exit points for the binary file;

recording indications of the entry and exit points in a record for the binary file;

propagating dependency information about the set of binary files to determine subsystem dependency information for one or more subsystems which contain binary files out of the set of binary files by:
  generating pairs of entry and exit points for binary files which are dependent on one another; and
  determining subsystem dependency information comprising entry and exit points for the one or more subsystems based on the generated pairs of entry and exit points for the set of binary files;
propagating the subsystem dependency information to determine system dependency information by:
  generating pairs of entry and exit points for subsystems in the system; and
  determining system dependency information comprising entry and exit points for the system based on the generated pairs of entry and exit points for subsystems in the system;
marking changed logical abstractions in one or more changed binary files;
marking unchanged logical abstractions which are in one or more unchanged binary files, the unchanged logical abstractions being dependent on marked changed logical abstractions in the one or more changed binary files;
comparing test coverage to marked changed logical abstractions and to marked unchanged logical abstractions;
prioritizing tests based on maximum test coverage of marked changed logical abstractions and marked unchanged logical abstractions; and
performing the prioritized tests according to test priorities to produce test results.

2. The method of claim 1 wherein the test coverage comprises tests for one subsystem.

3. The method of claim 1 wherein the test coverage comprises tests for plural subsystems.

4. The method of claim 3 wherein the test coverage comprises tests for plural subsystems and maximum test coverage is considered for marked changed logical abstractions and marked unchanged logical abstractions for said plural subsystems.

5. A computer-based service comprising:
  means for determining binary dependencies, comprising pairs of entry and exit points, for binary files in a defined system;
  means for propagating the binary dependencies to identify binary files dependent on other binary files in other subsystems;
  means for storing determined and propagated dependencies;
  means for marking changes in changed binary files;
  means for propagating marked changes using the determined and propagated dependencies to unchanged binary files; and
  means for prioritizing tests which cover the unchanged binary files based on test coverage of marked changes and propagated marked changes;
  means for performing prioritized tests according to test priorities to produce test results.

6. The service of claim 5 wherein the means for marking changes includes means for marking proposed changes.

7. A computer system comprising:
a processor coupled to volatile and nonvolatile memory;
binary files stored in memory;
software stored in memory comprising computer executable instructions for:
  recording dependency information for binary files comprising entry and exit points for the binary files;
  propagating dependency information about binary files to determine subsystem dependency information comprising entry and exit points for a subsystem of a system; and
  propagating subsystem dependency information to determine system dependency information comprising entry and exit points for the system;
  marking logical abstractions changed from a previous version in one or more changed binary files;
  propagating marked changes according to the dependency information comprising marking unchanged logical abstractions in one or more unchanged binary files dependent on marked changes in the one or more changed binary files;
  comparing test coverage to marked changed logical abstractions and to marked unchanged logical abstractions; and
  prioritizing tests based on maximum test coverage of marked changed logical abstractions and marked unchanged logical abstractions.

8. The computer system of claim 7, wherein maximum test coverage is based on the total number of marked changed and marked unchanged logical abstractions touched by a test system wide.

9. The computer system of claim 7, wherein maximum test coverage is based on the sum of the total number of marked changed logical abstractions in a first subsystem touched by a test, and marked unchanged logical abstractions touched by the test in the first subsystem, wherein the marked unchanged logical abstractions depend on marked changed logical abstractions in binary files in other subsystems.

* * * * *